(12) United States Patent
Mori et al.

(10) Patent No.: US 10,998,834 B2
(45) Date of Patent: May 4, 2021

(54) POWER CONVERSION DEVICE AND ELECTRIC POWER STEERING DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/631,908

(22) PCT Filed: Aug. 21, 2017

(86) PCT No.: PCT/JP2017/029827
§ 371 (c)(1),
(2) Date: Jan. 17, 2020

(87) PCT Pub. No.: WO2019/038815
PCT Pub. Date: Feb. 28, 2019

(65) Prior Publication Data
US 2020/0177102 A1    Jun. 4, 2020

(51) Int. Cl.
*H02M 7/5387* (2007.01)
*H02M 7/5395* (2006.01)

(52) U.S. Cl.
CPC ..... *H02M 7/53871* (2013.01); *H02M 7/5395* (2013.01); *H02M 2007/53876* (2013.01)

(58) Field of Classification Search
CPC .. H02M 2001/0009; H02P 21/24; H02P 27/06
See application file for complete search history.

(56) References Cited

U.S. PATENT DOCUMENTS

| | | | | |
|---|---|---|---|---|
| 5,631,819 A | * | 5/1997 | Masaki | H02M 7/53873 318/811 |
| 2007/0103950 A1 | * | 5/2007 | Arisawa | H02M 7/53875 363/132 |
| 2008/0067960 A1 | * | 3/2008 | Maeda | B62D 5/046 318/400.02 |
| 2009/0160376 A1 | * | 6/2009 | Yamada | H02P 27/12 318/400.02 |

(Continued)

FOREIGN PATENT DOCUMENTS

JP     4941686 B2     5/2012

OTHER PUBLICATIONS

International Search Report for PCT/JP2017/029827 dated Oct. 31, 2017 (PCT/ISA/210).

*Primary Examiner* — Yusef A Ahmed
(74) *Attorney, Agent, or Firm* — Sughrue Mion, PLLC; Richard C. Turner; David P. Emery

(57) ABSTRACT

A power conversion device is configured to output, to each of two inverters configured to invert a DC voltage output from a DC power supply to three-phase AC voltages, on/off signals for switching on and off respective semiconductor switching elements of each of the inverters so that, out of a plurality of voltage vectors defined so as to correspond to patterns of the on/off signals, the second closest voltage vector and the third closest voltage vector in phase to a voltage command vector that is based on a voltage command value calculated for each of the inverters are formed.

15 Claims, 26 Drawing Sheets

(56) References Cited

U.S. PATENT DOCUMENTS

| | | | |
|---|---|---|---|
| 2009/0160377 A1* | 6/2009 | Yamada | H02M 7/53871 318/400.02 |
| 2009/0322264 A1* | 12/2009 | Imura | H02P 21/0089 318/400.09 |
| 2010/0060211 A1* | 3/2010 | Hashimoto | H02P 27/08 318/400.02 |
| 2013/0249454 A1* | 9/2013 | Mori | H02P 6/16 318/400.09 |
| 2015/0022127 A1* | 1/2015 | Takahashi | H02P 21/10 318/400.02 |
| 2015/0084555 A1* | 3/2015 | Handa | H02P 27/085 318/400.02 |
| 2016/0190972 A1* | 6/2016 | Mori | H02M 7/5395 318/490 |
| 2016/0204726 A1* | 7/2016 | Mori | H02P 21/14 318/400.02 |
| 2016/0294317 A1* | 10/2016 | Nakai | H02P 21/14 |
| 2016/0308475 A1* | 10/2016 | Morii | H02P 21/02 |
| 2016/0329850 A1* | 11/2016 | Mori | H02P 27/08 |
| 2017/0019048 A1* | 1/2017 | Furukawa | H02P 25/22 |
| 2017/0019052 A1* | 1/2017 | Suzuki | B62D 5/046 |
| 2017/0063253 A1* | 3/2017 | Fukumaru | H02P 21/13 |
| 2017/0070171 A1* | 3/2017 | Tsukakoshi | H02P 21/00 |
| 2017/0324363 A1* | 11/2017 | Furukawa | H02P 27/06 |
| 2017/0331405 A1* | 11/2017 | Mori | H02P 21/22 |
| 2018/0006547 A1* | 1/2018 | Mori | H02P 25/03 |
| 2018/0079449 A1* | 3/2018 | Furukawa | B62D 5/0403 |
| 2018/0105201 A1* | 4/2018 | Mori | H02P 6/18 |
| 2018/0237058 A1* | 8/2018 | Furukawa | H02P 29/02 |
| 2018/0244308 A1* | 8/2018 | Furukawa | H02P 29/0241 |
| 2018/0269771 A1* | 9/2018 | Mori | H02M 7/53871 |
| 2018/0287538 A1* | 10/2018 | Nakashima | H02P 27/08 |
| 2018/0294755 A1* | 10/2018 | Mori | H02P 21/22 |
| 2018/0331645 A1* | 11/2018 | Aoki | H02M 7/53875 |
| 2019/0131903 A1* | 5/2019 | Kishita | H02P 21/22 |
| 2019/0241208 A1* | 8/2019 | Takase | B62D 5/046 |
| 2019/0256128 A1* | 8/2019 | Takase | H02P 27/08 |
| 2019/0256131 A1* | 8/2019 | Mori | H02M 7/64 |
| 2019/0280629 A1* | 9/2019 | Furukawa | H02P 21/06 |
| 2019/0329817 A1* | 10/2019 | Takase | H02M 7/5395 |
| 2019/0337553 A1* | 11/2019 | Minaki | H02P 21/13 |
| 2019/0375449 A1* | 12/2019 | Takase | B62D 5/0463 |
| 2020/0180682 A1* | 6/2020 | Takase | H02M 2001/385 |

* cited by examiner

FIG. 2

| θv1 [DEGREES] | VOLTAGE VECTORS TO BE OUTPUT | VOLTAGE VECTOR CLOSEST IN PHASE TO VOLTAGE COMMAND VECTOR V1* |
|---|---|---|
| 30~90 | V1(1), V3(1) | V2(1) |
| 90~150 | V2(1), V4(1) | V3(1) |
| 150~210 | V3(1), V5(1) | V4(1) |
| 210~270 | V2(1), V4(1) | V5(1) |
| 270~330 | V5(1), V1(1) | V6(1) |
| -30~30 | V6(1), V2(1) | V1(1) |

FIG. 3

| Qup1 | Qun1 | Qvp1 | Qvn1 | Qwp1 | Qwn1 | VOLTAGE VECTOR | Iin1 |
|---|---|---|---|---|---|---|---|
| 0 | 1 | 0 | 1 | 0 | 1 | V0(1) | 0 |
| 1 | 0 | 0 | 1 | 0 | 1 | V1(1) | Iu1 |
| 1 | 0 | 1 | 0 | 0 | 1 | V2(1) | -Iw1 |
| 0 | 1 | 1 | 0 | 0 | 1 | V3(1) | Iv1 |
| 0 | 1 | 1 | 0 | 1 | 0 | V4(1) | -Iu1 |
| 0 | 1 | 0 | 1 | 1 | 0 | V5(1) | Iw1 |
| 1 | 0 | 0 | 1 | 1 | 0 | V6(1) | -Iv1 |
| 1 | 0 | 1 | 0 | 1 | 0 | V7(1) | 0 |

FIG. 6

| PHASE CONDITION FOR VOLTAGE COMMAND VECTOR | OUTPUT DUTY OF EFFECTIVE VOLTAGE VECTOR | OUTPUT DUTY OF EFFECTIVE VOLTAGE VECTOR |
|---|---|---|
| $30° \leq \theta v1 < 90°$ | $D_{1(1)} = \sqrt{\frac{3}{2}} \dfrac{V_{\alpha(1)} + \frac{1}{\sqrt{3}} V_{\beta(1)}}{V_{dc}}$ | $D_{3(1)} = \sqrt{\frac{3}{2}} \dfrac{\frac{2}{\sqrt{3}} V_{\beta(1)}}{V_{dc}}$ |
| $90° \leq \theta v1 < 150°$ | $D_{2(1)} = \sqrt{\frac{3}{2}} \dfrac{\frac{2}{\sqrt{3}} V_{\beta(1)}}{V_{dc}}$ | $D_{4(1)} = \sqrt{\frac{3}{2}} \dfrac{-V_{\alpha(1)} + \frac{1}{\sqrt{3}} V_{\beta(1)}}{V_{dc}}$ |
| $150° \leq \theta v1 < 210°$ | $D_{3(1)} = \sqrt{\frac{3}{2}} \dfrac{-V_{\alpha(1)} + \frac{1}{\sqrt{3}} V_{\beta(1)}}{V_{dc}}$ | $D_{5(1)} = \sqrt{\frac{3}{2}} \dfrac{-V_{\alpha(1)} - \frac{1}{\sqrt{3}} V_{\beta(1)}}{V_{dc}}$ |
| $210° \leq \theta v1 < 270°$ | $D_{4(1)} = \sqrt{\frac{3}{2}} \dfrac{-V_{\alpha(1)} - \frac{1}{\sqrt{3}} V_{\beta(1)}}{V_{dc}}$ | $D_{6(1)} = \sqrt{\frac{3}{2}} \dfrac{-\frac{2}{\sqrt{3}} V_{\beta(1)}}{V_{dc}}$ |
| $270° \leq \theta v1 < 330°$ | $D_{5(1)} = \sqrt{\frac{3}{2}} \dfrac{-\frac{2}{\sqrt{3}} V_{\beta(1)}}{V_{dc}}$ | $D_{1(1)} = \sqrt{\frac{3}{2}} \dfrac{V_{\alpha(1)} - \frac{1}{\sqrt{3}} V_{\beta(1)}}{V_{dc}}$ |
| $-30° \leq \theta v1 < 30°$ | $D_{6(1)} = \sqrt{\frac{3}{2}} \dfrac{V_{\alpha(1)} - \frac{1}{\sqrt{3}} V_{\beta(1)}}{V_{dc}}$ | $D_{2(1)} = \sqrt{\frac{3}{2}} \dfrac{V_{\alpha(1)} + \frac{1}{\sqrt{3}} V_{\beta(1)}}{V_{dc}}$ |

FIG. 7

| θv2 [DEGREES] | VOLTAGE VECTORS TO BE OUTPUT | VOLTAGE VECTOR CLOSEST IN PHASE TO VOLTAGE COMMAND VECTOR V2* |
|---|---|---|
| 30~90 | V1(2), V3(2) | V2(2) |
| 90~150 | V2(2), V4(2) | V3(2) |
| 150~210 | V3(2), V5(2) | V4(2) |
| 210~270 | V2(2), V4(2) | V5(2) |
| 270~330 | V5(2), V1(2) | V6(2) |
| -30~30 | V6(2), V2(2) | V1(2) |

FIG. 8

| Qup2 | Qun2 | Qvp2 | Qvn2 | Qwp2 | Qwn2 | VOLTAGE VECTOR | Iin2 |
|---|---|---|---|---|---|---|---|
| 0 | 1 | 0 | 1 | 0 | 1 | V0(2) | 0 |
| 1 | 0 | 0 | 1 | 0 | 1 | V1(2) | Iu2 |
| 1 | 0 | 1 | 0 | 0 | 1 | V2(2) | -Iw2 |
| 0 | 1 | 1 | 0 | 0 | 1 | V3(2) | Iv2 |
| 0 | 1 | 1 | 0 | 1 | 0 | V4(2) | -Iu2 |
| 0 | 1 | 0 | 1 | 1 | 0 | V5(2) | Iw2 |
| 1 | 0 | 0 | 1 | 1 | 0 | V6(2) | -Iv2 |
| 1 | 0 | 1 | 0 | 1 | 0 | V7(2) | 0 |

FIG. 11

| PHASE CONDITION FOR VOLTAGE COMMAND VECTOR | OUTPUT DUTY OF EFFECTIVE VOLTAGE VECTOR | OUTPUT DUTY OF EFFECTIVE VOLTAGE VECTOR |
|---|---|---|
| $30° \leq \theta v2 < 90°$ | $D_{1(2)} = \sqrt{\frac{3}{2}} \dfrac{V_{\alpha(2)} + \frac{1}{\sqrt{3}} V_{\beta(2)}}{V_{dc}}$ | $D_{3(2)} = \sqrt{\frac{3}{2}} \dfrac{\frac{2}{\sqrt{3}} V_{\beta(2)}}{V_{dc}}$ |
| $90° \leq \theta v2 < 150°$ | $D_{2(2)} = \sqrt{\frac{3}{2}} \dfrac{\frac{2}{\sqrt{3}} V_{\beta(2)}}{V_{dc}}$ | $D_{4(2)} = \sqrt{\frac{3}{2}} \dfrac{-V_{\alpha(2)} + \frac{1}{\sqrt{3}} V_{\beta(2)}}{V_{dc}}$ |
| $150° \leq \theta v2 < 210°$ | $D_{3(2)} = \sqrt{\frac{3}{2}} \dfrac{-V_{\alpha(2)} + \frac{1}{\sqrt{3}} V_{\beta(2)}}{V_{dc}}$ | $D_{5(2)} = \sqrt{\frac{3}{2}} \dfrac{-V_{\alpha(2)} - \frac{1}{\sqrt{3}} V_{\beta(2)}}{V_{dc}}$ |
| $210° \leq \theta v2 < 270°$ | $D_{4(2)} = \sqrt{\frac{3}{2}} \dfrac{-V_{\alpha(2)} - \frac{1}{\sqrt{3}} V_{\beta(2)}}{V_{dc}}$ | $D_{6(2)} = \sqrt{\frac{3}{2}} \dfrac{-\frac{2}{\sqrt{3}} V_{\beta(2)}}{V_{dc}}$ |
| $270° \leq \theta v2 < 330°$ | $D_{5(2)} = \sqrt{\frac{3}{2}} \dfrac{-\frac{2}{\sqrt{3}} V_{\beta(2)}}{V_{dc}}$ | $D_{1(2)} = \sqrt{\frac{3}{2}} \dfrac{V_{\alpha(2)} - \frac{1}{\sqrt{3}} V_{\beta(2)}}{V_{dc}}$ |
| $-30° \leq \theta v2 < 30°$ | $D_{6(2)} = \sqrt{\frac{3}{2}} \dfrac{V_{\alpha(2)} - \frac{1}{\sqrt{3}} V_{\beta(2)}}{V_{dc}}$ | $D_{2(2)} = \sqrt{\frac{3}{2}} \dfrac{V_{\alpha(2)} + \frac{1}{\sqrt{3}} V_{\beta(2)}}{V_{dc}}$ |

| θv1 [DEGREES] | VOLTAGE VECTORS TO BE OUTPUT | VOLTAGE VECTOR CLOSEST IN PHASE TO CURRENT VECTOR |
|---|---|---|
| 30~90 | V1(1), V3(1) | V2(1) |
| 90~150 | V2(1), V4(1) | V3(1) |
| 150~210 | V3(1), V5(1) | V4(1) |
| 210~270 | V2(1), V4(1) | V5(1) |
| 270~330 | V5(1), V1(1) | V6(1) |
| -30~30 | V6(1), V2(1) | V1(1) |

FIG. 19

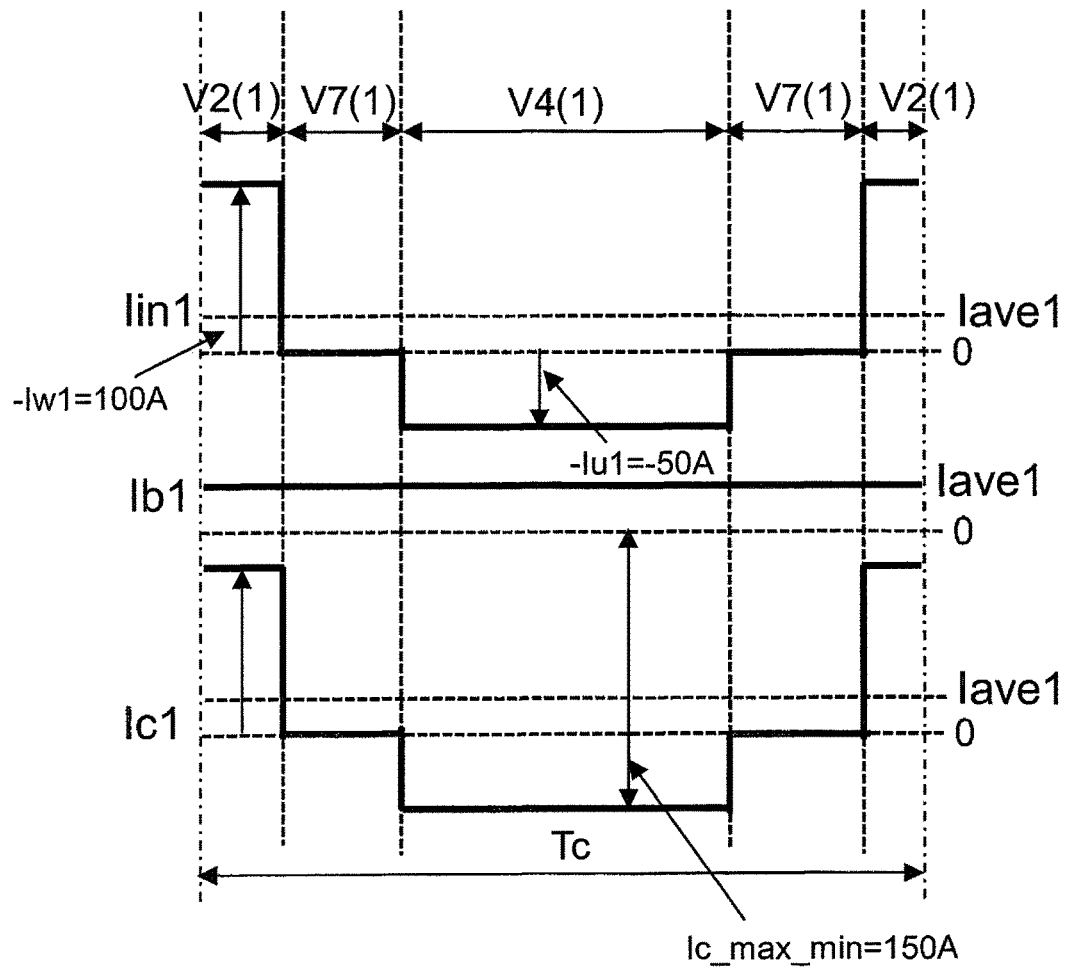

FIG. 20

| θi1[deg] | VOLTAGE VECTOR CLOSEST IN PHASE TO CURRENT VECTOR | VOLTAGE MODULATION METHOD | CARRIER WAVE INVERTED PHASE |
|---|---|---|---|
| 30~90 | V2(1) | LOWER SOLID TWO-PHASE MODULATION | ONE PHASE OF TWO PHASES OTHER THAN MINIMUM PHASE |
| 90~150 | V3(1) | UPPER SOLID TWO-PHASE MODULATION | ONE PHASE OF TWO PHASES OTHER THAN MAXIMUM PHASE |
| 150~210 | V4(1) | LOWER SOLID TWO-PHASE MODULATION | ONE PHASE OF TWO PHASES OTHER THAN MINIMUM PHASE |
| 210~270 | V5(1) | UPPER SOLID TWO-PHASE MODULATION | ONE PHASE OF TWO PHASES OTHER THAN MAXIMUM PHASE |
| 270~330 | V6(1) | LOWER SOLID TWO-PHASE MODULATION | ONE PHASE OF TWO PHASES OTHER THAN MINIMUM PHASE |
| 330~30 | V1(1) | UPPER SOLID TWO-PHASE MODULATION | ONE PHASE OF TWO PHASES OTHER THAN MAXIMUM PHASE |

FIG. 22

| θi2[deg] | VOLTAGE VECTOR CLOSEST IN PHASE TO CURRENT VECTOR | VOLTAGE MODULATION METHOD | CARRIER WAVE INVERTED PHASE |
|---|---|---|---|
| 30~90 | V2(2) | LOWER SOLID TWO-PHASE MODULATION | ONE PHASE OF TWO PHASES OTHER THAN MINIMUM PHASE |
| 90~150 | V3(2) | UPPER SOLID TWO-PHASE MODULATION | ONE PHASE OF TWO PHASES OTHER THAN MAXIMUM PHASE |
| 150~210 | V4(2) | LOWER SOLID TWO-PHASE MODULATION | ONE PHASE OF TWO PHASES OTHER THAN MINIMUM PHASE |
| 210~270 | V5(2) | UPPER SOLID TWO-PHASE MODULATION | ONE PHASE OF TWO PHASES OTHER THAN MAXIMUM PHASE |
| 270~330 | V6(2) | LOWER SOLID TWO-PHASE MODULATION | ONE PHASE OF TWO PHASES OTHER THAN MINIMUM PHASE |
| 330~30 | V1(2) | UPPER SOLID TWO-PHASE MODULATION | ONE PHASE OF TWO PHASES OTHER THAN MAXIMUM PHASE |

FIG. 23

| θi1[deg] | VOLTAGE VECTOR CLOSEST IN PHASE TO CURRENT VECTOR | VOLTAGE MODULATION METHOD | CARRIER WAVE INVERTED PHASE |
|---|---|---|---|
| 30~60 | V2(1) | LOWER SOLID TWO-PHASE MODULATION | ONE PHASE OF TWO PHASES OTHER THAN MINIMUM PHASE |
| 60~90 | | | REMAINING ONE PHASE |
| 90~120 | V3(1) | UPPER SOLID TWO-PHASE MODULATION | ONE PHASE OF TWO PHASES OTHER THAN MAXIMUM PHASE |
| 120~150 | | | REMAINING ONE PHASE |
| 150~180 | V4(1) | LOWER SOLID TWO-PHASE MODULATION | ONE PHASE OF TWO PHASES OTHER THAN MINIMUM PHASE |
| 180~210 | | | REMAINING ONE PHASE |
| 210~240 | V5(1) | UPPER SOLID TWO-PHASE MODULATION | ONE PHASE OF TWO PHASES OTHER THAN MAXIMUM PHASE |
| 240~270 | | | REMAINING ONE PHASE |
| 270~300 | V6(1) | LOWER SOLID TWO-PHASE MODULATION | ONE PHASE OF TWO PHASES OTHER THAN MINIMUM PHASE |
| 300~330 | | | REMAINING ONE PHASE |
| 330~0 | V1(1) | UPPER SOLID TWO-PHASE MODULATION | ONE PHASE OF TWO PHASES OTHER THAN MAXIMUM PHASE |
| 0~30 | | | REMAINING ONE PHASE |

POWER CONVERSION DEVICE AND ELECTRIC POWER STEERING DEVICE

CROSS REFERENCE TO RELATED APPLICATIONS

This application is a National Stage of International Application No. PCT/JP2017/029827 filed Aug. 21, 2017.

TECHNICAL FIELD

The present invention relates to a power conversion device configured to reduce a capacitor current, and to an electric power steering device including the power conversion device.

BACKGROUND ART

As an example of a related-art power conversion device, there is given a power conversion device configured to use two inverters so as to apply voltages to respective two sets of windings of a multi-phase rotary machine including the two sets of windings (see, for example, Patent Literature 1).

In the power conversion device described in Patent Literature 1, the following control method is employed in order to avoid a mode in which the two inverters are simultaneously discharged, to thereby reduce a capacitor current. Specifically, a center value of a voltage command value corresponding to one inverter is shifted so as to be lower than a duty range that can be output, and a center value of a voltage command value corresponding to the other inverter is shifted so as to be higher than a duty range that can be output.

CITATION LIST

Patent Literature

[PTL 1] JP 4941686 B2

SUMMARY OF INVENTION

Technical Problem

The control method described in Patent Literature 1 is effective for a power conversion device configured to supply a discharge current from one common capacitor to two inverters. In order to keep constant a voltage applied to the inverters, it is required to reduce an impedance caused by a wiring inductance and a wiring resistance between the capacitor provided in parallel with the inverters and the inverters by arranging the capacitor so as to be as close to the inverters as possible.

Therefore, in the power conversion device, it is preferred to employ not a configuration in which one common capacitor is provided, but a configuration in which capacitors are individually provided for the two respective inverters. The control method described in Patent Literature 1 is not appropriate as a method of sufficiently reducing the capacitor currents for a power conversion device that employs the configuration in which capacitors are individually provided for the two respective inverters.

The present invention has been made in view of the above-mentioned problem, and therefore has an object to provide a power conversion device contributing to reduction in capacitor currents even when a configuration in which capacitors are individually provided for two respective inverters is employed, and an electric power steering device including the power conversion device.

Solution to Problem

According to one embodiment of the present invention, there is provided a power conversion device including: two inverters, each of which includes a plurality of semiconductor switching elements, and is configured to invert a DC voltage output from a DC power supply into three-phase AC voltages by the respective semiconductor switching elements being switched on and off, to output the three-phase AC voltages; two capacitors, which individually correspond to the respective two inverters, and are provided in parallel between the DC power supply and the two inverters; and a control unit configured to calculate voltage command values, which are command values for the three-phase AC voltages to be output from each of the two inverters, based on an input control command value, and output on/off signals for switching on and off the respective semiconductor switching elements of each of the two inverters in accordance with the voltage command values calculated for each of the two inverters, wherein the control unit is configured to output the on/off signals to each of the two inverters so that, out of a plurality of voltage vectors defined so as to correspond to patterns of the on/off signals, the second closest voltage vector and the third closest voltage vector in phase to a voltage command vector that is based on the voltage command values are formed.

According to the present invention, it is possible to provide the power conversion device contributing to the reduction in the capacitor currents even when the configuration in which the capacitors are individually provided for the two respective inverters is employed, and the electric power steering device including the power conversion device.

BRIEF DESCRIPTION OF DRAWINGS

FIG. 2 is a table for showing voltage vectors to be output so as to correspond to a phase θv1 of a voltage command vector V1* in the first embodiment of the present invention.

FIG. 3 is a table for showing voltage vectors to be output so as to correspond to patterns of on/off signals Qup1 to Qwn1 in the first embodiment of the present invention.

FIG. 6 is a table for showing the voltage vectors to be output so as to correspond to the phase θv1 of the voltage command vector V1* in the first embodiment of the present invention.

FIG. 7 is a table for showing the voltage vectors to be output so as to correspond to a phase θv2 of a voltage command vector V2* in the first embodiment of the present invention.

FIG. 8 is a table for showing voltage vectors to be output so as to correspond to on/off signals Qup2 to Qwn2 in the first embodiment of the present invention.

FIG. 11 is a table for showing duties of the voltage vectors to be output so as to correspond to the phase θv2 of the voltage command vector V2* in the first embodiment of the present invention.

FIG. 19 is a graph for showing a comparative example of a control method in the second embodiment of the present invention.

FIG. 20 is a table for showing voltage modulation methods to be employed so as to correspond to the phase θi1 of the current vector in a third embodiment of the present invention.

FIG. 22 is a table for showing voltage modulation methods to be employed so as to correspond to the phase θi2 of the current vector in the third embodiment of the present invention.

FIG. 23 is a table for showing voltage modulation methods to be employed so as to correspond to the phase θi1 of the current vector in a fourth embodiment of the present invention.

DESCRIPTION OF EMBODIMENTS

Now, a power conversion device and an electric power steering device according to preferred embodiments of the present invention are described with reference to the accompanying drawings. In the illustration of the drawings, the same components or corresponding components are denoted by the same reference symbols, and the overlapping description thereof is herein omitted.

First Embodiment

Figure 1:
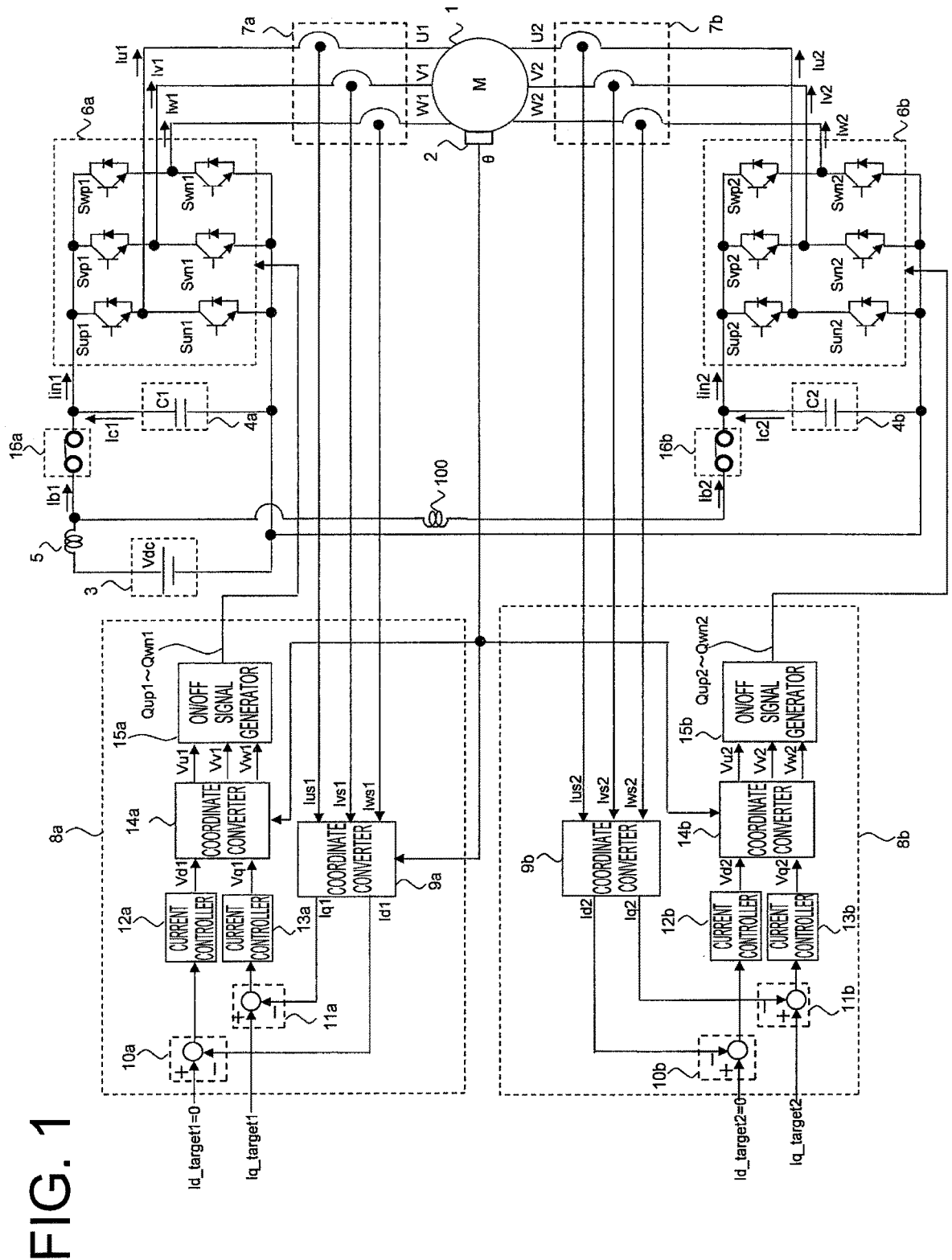
FIG. 1 is a diagram for illustrating an overall configuration of a power conversion device according to a first embodiment of the present invention.

FIG. 1 is a diagram for illustrating an overall configuration of a power conversion device according to a first embodiment of the present invention. In FIG. 1, a DC power supply 3 and a motor 1 are also illustrated. The DC power supply 3 is connected to an input side of the power conversion device. The motor 1 is connected to an output side of the power conversion device.

As illustrated in FIG. 1, the power conversion device according to the first embodiment includes a capacitor 4a, a capacitor 4b, an inverter 6a, an inverter 6b, a current detector 7a, a current detector 7b, a controller 8a, a controller 8b, a relay 16a, and a relay 16b.

The motor 1 is a three-phase AC motor including three-phase windings formed of a winding U1 in a U1 phase, a winding V1 in a V1 phase, and a winding W1 in a W1 phase, and three-phase windings formed of a winding U2 in a U2 phase, a winding V2 in a V2 phase, and a winding W2 in a W2 phase. Specific examples of the motor 1 include a permanent-magnet synchronous motor, an induction motor, and a synchronous reluctance motor, but any type of motor may be used as the motor 1 as long as the motor has two sets of three-phase windings. A case in which a permanent-magnet synchronous motor of non-salient type is used as the motor 1 is exemplified herein.

A position detector 2 is configured to detect a rotation position θ of the motor 1 to output the detected rotation position θ to the controller 8a and the controller 8b.

The DC power supply 3 includes a high electric potential-side terminal and a low electric potential-side terminal, and is configured to output a DC voltage Vdc to the inverter 6a and the inverter 6b as a voltage between both of the terminals. The DC power supply 3 includes any devices configured to output a DC voltage, such as a battery, a DC-DC converter, a diode rectifier, and a PWM rectifier.

The two capacitors 4a and 4b individually correspond to the respective inverters 6a and 6b, and are provided in parallel between the DC power supply 3 and the inverters 6a and 6b.

The capacitor 4a is a capacitor having an electrostatic capacitance of C1. The capacitor 4a is connected in parallel with the DC power supply 3, and is configured to suppress fluctuation of the DC voltage Vdc input to the inverter 6a, to thereby achieve a stable DC voltage.

The capacitor 4b is a capacitor having an electrostatic capacitance of C2. The capacitor 4b is connected in parallel with the DC power supply 3, and is configured to suppress fluctuation of the DC voltage Vdc input to the inverter 6b, to thereby achieve a stable DC voltage.

An inductance 5 represents an inductance value contained inside the DC power supply 3 and in an intermediate cable. In general, in the power conversion device, a common mode choke coil is connected as a noise filter to a vicinity of the DC power supply 3 so as to suppress noise flowing out from each of the inverter 6a and the inverter 6b to the DC power supply 3. An inductance value of such a noise filter is also contained in the inductance 5.

The two inverters 6a and 6b each include a plurality of semiconductor switching elements, and is configured to invert the DC voltage Vdc output from the DC power supply 3 into three-phase AC voltages through switching on/off the respective semiconductor switching elements, to output the three-phase AC voltages.

The inverter 6a is a three-phase inverter including three semiconductor switching elements Sup1 to Swp1 on a high electric potential side and three semiconductor switching elements Sun1 to Swn1 on a low electric potential side. The semiconductor switching elements Sup1 to Swp1 and the semiconductor switching elements Sun1 to Swn1 are switched on/off based on on/off signals Qup1 to Qwn1 output from the controller 8a. As a result, the inverter 6a inverts the DC voltage Vdc input from the DC power supply 3 into the AC voltages. The inverter 6a applies the AC voltages after the conversion to the winding U1, the winding V1, and the winding W1 of the motor 1, to thereby supply a current Iu1, a current Iv1, and a current Iw1 to the winding U1, the winding V1, and the winding W1, respectively.

The on/off signals Qup1, Qun1, Qvp1, Qvn1, Qwp1, and Qwn1 are the switching signals for switching on and off the semiconductor switching elements Sup1, Sun1, Svp1, Svn1, Swp1, and Swn1, respectively. In the following, when the value of each of the on/off signals Qup1 to Qwn1 is 1, a signal for turning on a semiconductor switching element corresponding to the on/off signal is output. When the value of the signal is 0, a signal for tuning off the semiconductor element corresponding to the on/off signal is output.

As each of the semiconductor switching elements Sup1 to Swn1, a semiconductor switching device, for example, an IGBT, a bipolar transistor, or a MOS power transistor and a diode connected to each other in antiparallel are used.

The inverter 6b is a three-phase inverter including three semiconductor switching elements Sup2 to Swp2 on a high electric potential side and three semiconductor switching elements Sun2 to Swn2 on a low electric potential side. The semiconductor switching elements Sup2 to Swp2 and the semiconductor switching elements Sun2 to Swn2 are switched on/off based on on/off signals Qup2 to Qwn2 output from the controller 8b. As a result, the inverter 6b inverts the DC voltage Vdc input from the DC power supply 3 into the AC voltages. The inverter 6b applies the AC voltages after the conversion to the winding U2, the winding V2, and the winding W2 of the motor 1, to thereby supply a current Iu2, a current Iv2, and a current Iw2 to the winding U2, the winding V2, and the winding W2, respectively.

The on/off signals Qup2, Qun2, Qvp2, Qvn2, Qwp2, and Qwn2 are the switching signals for switching on and off the semiconductor switching elements Sup2, Sun2, Svp2, Svn2, Swp2, and Swn2, respectively. In the following, when the value of each of the on/off signals Qup2 to Qwn2 is 1, a signal for turning on a semiconductor switching element corresponding to the on/off signal is output. When the value of the signal is 0, a signal for tuning off the semiconductor element corresponding to the on/off signal is output.

As each of the semiconductor switching elements Sup2 to Swn2, a semiconductor switching device, for example, an IGBT, a bipolar transistor, or a MOS power transistor and a diode connected to each other in antiparallel are used.

The current detector 7a is configured to detect values of the current Iu1, the current Iv1, and the current Iw1 flowing through the winding U1, the winding V1, and the winding W1 of the motor 1 as current detection values Ius1, Ivs1, and Iws1, respectively.

The current detector 7a may be a current detector of such a type that a current detection resistor is provided in series with each of the semiconductor switching elements Sun1, Svn1, and Swn1 of the inverter 6a, to thereby detect each of the current detection values Ius1, Ivs1, and Iws1. Moreover, the current detector 7a may be a current detector of such a type that a current detection resistor is provided between the inverter 6a and the capacitor 4a, to thereby detect an inverter input current Iin1, and obtain the current detection values Ius1, Ivs1, and Iws1 from this detection value.

The current detector 7b is configured to detect values of the current Iu2, the current Iv2, and the current Iw2 flowing through the winding U2, the winding V2, and the winding W2 of the motor 1 as current detection values Ius2, Ivs2, and Iws2, respectively.

The current detector 7b may be a current detector of such a type that a current detection resistor is provided in series with each of the semiconductor switching elements Sun2, Svn2, and Swn2 of the inverter 6b, to thereby detect each of the current detection values Ius2, Ivs2, and Iws2. Moreover, the current detector 7b may be a current detector of such a type that a current detection resistor is provided between the inverter 6b and the capacitor 4b, to thereby detect an inverter input current Iin2, and obtain the current detection values Ius2, Ivs2, and Iws2 from this detection value.

The two relays 16a and 16b individually correspond to the respective inverters 6a and 6b, and are provided in series between the DC power supply 3 and the capacitors 4a and 4b.

The relay 16a is provided between the DC power supply 3 and the capacitor 4a, and has a function of electrically opening a connection between the DC power supply 3 and the inverter 6a. The relay 16a is formed through use of a semiconductor switching device, for example, an electromagnetic contactor, or a semiconductor switching element such as an IGBT, a bipolar transistor, or a MOS power transistor.

The relay 16a is configured to close or open the connection between the DC power supply 3 and the inverter 6a in accordance with an on/off signal (not shown) from the controller 8a. For example, when any one of the current detection values Ius1, Ivs1, and Iws1 exceeds a threshold value set in advance, the controller 8a detects a failure of the inverter 6a or the current detector 7a, to thereby output a signal for opening the relay 16a. As a result, the path between the DC power supply 3 and the inverter 6a is opened. Influence of the failure of the inverter 6a or the current detector 7a on the DC power supply 3 and the inverter 6b can be eliminated by the relay 16a.

The relay 16b is provided between the DC power supply 3 and the capacitor 4b, and has a function of electrically opening a connection between the DC power supply 3 and the inverter 6b. The relay 16b is formed of a semiconductor switching device, for example, an electromagnetic contactor, or a semiconductor switching element such as an IGBT, a bipolar transistor, or a MOS power transistor.

The relay 16b is configured to close or open the connection between the DC power supply 3 and the inverter 6b in accordance with an on/off signal (not shown) from the controller 8b. For example, when any one of the current detection values Ius2, Ivs2, and Iws2 exceeds a threshold value set in advance, the controller 8b detects a failure of the inverter 6b or the current detector 7b, to thereby output a signal for opening the relay 16b. As a result, the path between the DC power supply 3 and the inverter 6b is opened. Influence of the failure of the inverter 6b or the current detector 7b on the DC power supply 3 and the inverter 6b can be eliminated by the relay 16b.

In this manner, when a control unit formed of the controller 8a and the controller 8b detects a failure of any one of the two inverters 6a and 6b, the control unit opens the relay corresponding to the failed inverter.

Current command values Id_target1 and Iq_target1 set as control command values for the motor 1 are input to the controller 8a. A case in which the current command value Id_target1 is set to 0 is herein exemplified. The controller 8a is configured to output the on/off signals Qup1 to Qwn1 based on the input current command values Id_target1 and Iq_target1, the rotation position θ input from the position detector 2, and the current detection values Ius1, Ivs1, and Iws1 input from the current detector 7a.

A case in which the command values for the currents supplied to the motor 1 are set as the control command values for the motor 1 is exemplified, but the control command values are not limited thereto. For example, when the V/F control is applied to the motor 1, the control command value is a speed command value for the motor 1. When a rotation position of the motor 1 is controlled, the control command value is a position command value for the motor 1. Moreover, the case in which the controller 8a determines the on/off signals Qup1 to Qwn1 based on the current detection values Ius1, Ivs1, and Iws1 input from the current detector 7a is exemplified, but the configuration is not limited to this case. For example, the controller 8a may be configured to determine the on/off signals Qup1 to Qwn1 from the current command values Id_target1 and Iq_target1 in a feedforward manner.

A description is now given of respective elements constructing the controller 8a. The controller 8a includes a coordinate converter 9a, a subtractor 10a, a subtractor 11a, a current controller 12a, a current controller 13a, a coordinate converter 14a, and an on/off signal generator 15a. The controller 8a is implemented by, for example, a microcomputer, a read only memory (ROM), and a random access memory (RAM). The microcomputer is configured to execute arithmetic processing. The ROM is configured to store data such as program data and fixed value data. The RAM is configured so that stored data can be updated, and successively rewritten.

The coordinate converter 9a is configured to calculate currents Id1 and Iq1 on rotating two axes based on the current detection values Ius1, Ivs1, and Iws1 input from the current detector 7a and the rotation position θ input from the position detector 2, to output the current Id1 to the subtractor 10a and output the current Iq1 to the subtractor 11a.

The subtractor 10a is configured to subtract the current Id1 on the rotating two axes from the current command value Id_target1, to output a result of the subtraction to the current controller 12a.

The subtractor 11a is configured to subtract the current Iq1 on the rotating two axes from the current command value Iq_target1, to output a result of the subtraction to the current controller 13a.

The current controller 12a is configured to apply proportional and integral control to the output value of the subtractor 10a so that the output value is zero, to thereby calculate a voltage Vd1 on the rotating two axes to output the voltage Vd1 to the coordinate converter 14a.

The current controller 13a is configured to apply proportional and integral control to the output value of the subtractor 11a so that the output value is zero, to thereby calculate a voltage Vq1 on the rotating two axes to output the voltage Vq1 to the coordinate converter 14a.

The coordinate converter 14a is configured to calculate voltage command values Vu1, Vv1, and Vw1 based on the voltages Vd1 and Vq1 on the rotating two axes, and the rotation position θ input from the position detector 2, to output a result of the calculation to the on/off signal generator 15a.

The on/off signal generator 15a is configured to output the on/off signals Qup1 to Qwn1 based on the voltage command values Vu1, Vv1, and Vw1.

A detailed description is now given of an operation of the on/off signal generator 15a. FIG. 2 is a table for showing voltage vectors to be output so as to correspond to the phase θv1 of the voltage command vector V1* in the first embodiment of the present invention.

As shown in FIG. 2, the on/off signal generator 15a selects and outputs two types of voltage vectors in accordance with a phase θv1 of the voltage command vector V1* based on the voltage command values Vu1, Vv1, and Vw1. For example, when the phase θv1 is equal to or larger than 30 degrees, and smaller than 90 degrees, two types of voltage vectors V1(1) and V3(1) are selected. When the phase θv1 is equal to or larger than 90 degrees, and smaller than 150 degrees, two types of voltage vectors V2 (1) and V4 (1) are selected. As shown in FIG. 2, similarly, the on/off signal generator 15a selects two types of voltage vectors so as to correspond to the phase θv1.

Figure 4:
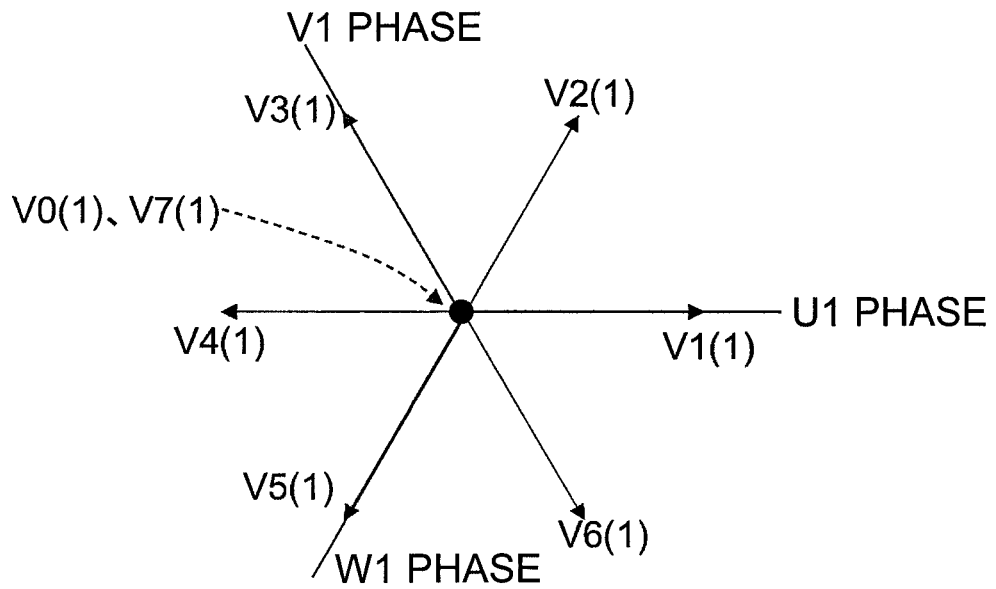
FIG. 4 is a diagram for illustrating voltage vectors V0 (1) to V7 (1) of FIG. 3.

A description is now given of the voltage vectors. FIG. 3 is a table for showing voltage vectors to be output so as to correspond to patterns of the on/off signals Qup1 to Qwn1 in the first embodiment of the present invention. FIG. 4 is a diagram for illustrating the voltage vectors V0(1) to V7(1) of FIG. 3.

As shown in FIG. 3, the voltage vector is a voltage vector determined so as to correspond to the patterns of the on/off signals Qup1 to Qwn1. The voltage vectors V0(1) to V7(1) of FIG. 3 are illustrated as in FIG. 4. As illustrated in FIG. 4, the voltage vectors V1(1) to V6(1) are effective voltage vectors having magnitudes arranged at every phase difference of 60 degrees. The voltage vectors V0(1) and V7(1) are zero-voltage vectors without a magnitude.

Figure 5:
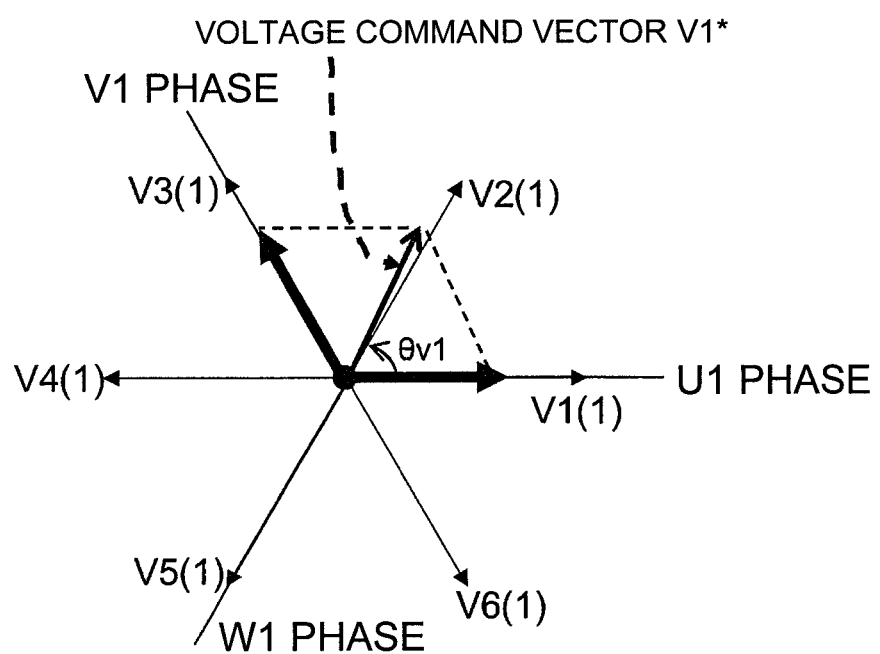
FIG. 5 is a diagram for illustrating voltage vectors to be output when the phase θv1 of the voltage command vector V1* is equal to or larger than 30 degrees and smaller than 90 degrees in the first embodiment of the present invention.

A description of the operation of the on/off signal generator 15a is continuously given. FIG. 5 is a diagram for illustrating the voltage vectors to be output when the phase θv1 of the voltage command vector V1* is equal to or larger than 30 degrees and smaller than 90 degrees in the first embodiment of the present invention. In FIG. 5, the phase θv1 is approximately 62 degrees.

When the phase θv1 is equal to or larger than 30 degrees and smaller than 90 degrees, the voltage vector closest in phase to the voltage command vector V1* is the voltage vector V2(1) as illustrated in FIG. 5. In this case, the output voltage vectors are the second closest voltage vector V3(1) and the third closest voltage vector V1(1) in phase to the voltage command vector V1*.

Output periods of the voltage vectors V1 (1) and V3 (1) are adjusted so that a resultant vector formed by the voltages V1 (1) and V3(1) matches the voltage command vector V1*. In this case, the voltage command vector V1* is calculated through use of the voltage command values Vu1, Vv1, and Vw1 as given by the following Expression (1-1).

$$V1^* = 0.8165 \times (Vu1 + a \times Vv1 + a^2 \times Vw1) \qquad (1\text{-}1)$$

In Expression (1-1), $a = \exp(j \times 120)$ and $j^2 = -1$.

The on/off signal generator 15a thus calculates the voltage command vector V1* as given by Expression (1-1). The on/off signal generator 15a adjusts the magnitudes of the voltage vectors V1 (1) and V3 (1) so that the resultant vector of those voltage vectors matches the voltage command vector V1*.

As a specific example, duty values for the respective voltage vectors to be output so as to correspond to the phase θv1 of the voltage command vector V1* are shown in FIG. 6. FIG. 6 is a table for showing the duties of the voltage vectors to be output so as to correspond to the phase θv1 of the voltage command vector V1* in the first embodiment of the present invention.

In FIG. 6, $V_{\alpha(1)}$ and $V_{\beta(1)}$ are voltages obtained by expressing the voltage command values Vu1, Vv1, and Vw1 on stationary two axes. An α axis matches the U1-phase axis. A β axis is advanced in phase by 90 degrees with respect to the α axis. $D_{1(1)}$, $D_{2(1)}$, $D_{3(1)}$, $D_{4(1)}$, $D_{5(1)}$, and $D_{6(1)}$ are output duties corresponding to the voltage vectors V1 (1), V2 (1), V3 (1), V4 (1), V5 (1), and V6 (1), respectively.

For example, when a control cycle is Ts, and the phase θv1 of the voltage command vector V1* is equal to or larger than 30 degrees, and is smaller than 90 degrees, the respective output periods of the voltage vectors are only required to be set to $D_{1(1)} \times Ts$ for the voltage V1 (1), $D_{3(1)} \times Ts$ for the voltage V3 (1), and $(1-D_{1(1)}-D_{3(1)}) \times Ts$ for the zero voltage vector, namely, the voltage vector V0 (1) or V7 (1). The same applies to the cases in which the conditions of the phase θv1 are different.

Back to the description of FIG. 1, current command values Id_target2 and Iq_target2 set as control command values for the motor 1 are input to the controller 8b. A case in which the current command value Id_target2 is set to 0 is herein exemplified. The controller 8b is configured to output the on/off signals Qup2 to Qwn2 based on the input current command values Id_target2 and Iq_target2, the rotation position θ input from the position detector 2, and the current detection values Ius2, Ivs2, and Iws2 input from the current detector 7b.

A case in which the command values for the currents supplied to the motor 1 are set as the control command values for the motor 1 is exemplified, but the control command values are not limited thereto. For example, when the V/F control is applied to the motor 1, the control command value is a speed command value for the motor 1. When a rotation position of the motor 1 is controlled, the control command value is a position command value for the motor 1. Moreover, the case in which the controller 8b determines the on/off signals Qup2 to Qwn2 based on the current detection values Ius2, Ivs2, and Iws2 input from the current detector 7b is exemplified, but the configuration is not limited to this case. For example, the controller 8b may be configured to determine the on/off signals Qup2 to Qwn2 from the current command values Id_target2 and Iq_target2 in a feedforward manner.

A description is now given of respective elements constructing the controller 8b. The controller 8b includes a coordinate converter 9b, a subtractor 10b, a subtractor 11b, a current controller 12b, a current controller 13b, a coordinate converter 14b, and an on/off signal generator 15b. The controller 8b is implemented by, for example, a microcomputer, a read only memory (ROM), and a random access memory (RAM). The microcomputer is configured to execute arithmetic processing. The ROM is configured to store data such as program data and fixed value data. The RAM is configured so that stored data can be updated, and successively rewritten.

The coordinate converter 9b is configured to calculate currents Id2 and Iq2 on rotating two axes based on the current detection values Ius2, Ivs2, and Iws2 input from the current detector 7b and the rotation position e input from the position detector 2, to output the current Id2 to the subtractor 10b and output the current Iq2 to the subtractor 11b.

The subtractor 10b is configured to subtract the current Id2 on the rotating two axes from the current command value Id_target2, to output a result of the subtraction to the current controller 12b.

The subtractor 11b is configured to subtract the current Iq2 on the rotating two axes from the current command value Iq_target2, to output a result of the subtraction to the current controller 13b.

The current controller 12b is configured to apply proportional and integral control to the output value of the subtractor 10b so that the output value is zero, to thereby calculate a voltage Vd2 on the rotating two axes to output the voltage Vd2 to the coordinate converter 14b.

The current controller 13b is configured to apply proportional and integral control to the output value of the subtractor 11b so that the output value is zero, to thereby calculate a voltage Vq2 on the rotating two axes to output the voltage Vq2 to the coordinate converter 14a.

The coordinate converter 14b is configured to calculate voltage command values Vu2, Vv2, and Vw2 based on the voltages Vd2 and Vq2 on the rotating two axes, and the rotation position θ input from the position detector 2, to output a result of the calculation to the on/off signal generator 15b.

The on/off signal generator 15b is configured to output the on/off signals Qup2 to Qwn2 based on the voltage command values Vu2, Vv2, and Vw2.

A detailed description is now given of an operation of the on/off signal generator 15b. FIG. 7 is a table for showing voltage vectors to be output so as to correspond to the phase θv2 of the voltage command vector V2* in the first embodiment of the present invention.

As shown in FIG. 7, the on/off signal generator 15b selects and outputs two types of voltage vectors in accordance with a phase θv2 of the voltage command vector V2* based on the voltage command values Vu2, Vv2, and Vw2. For example, when the phase θv2 is equal to or larger than 30 degrees, and smaller than 90 degrees, two types of voltage vectors V1(2) and V3(2) are selected. When the phase θv2 is equal to or larger than 90 degrees, and smaller than 150 degrees, two types of voltage vectors V2 (2) and V4 (2) are selected. As shown in FIG. 7, similarly, the on/off signal generator 15b selects two types of voltage vectors so as to correspond to the phase θv2.

Figure 9:
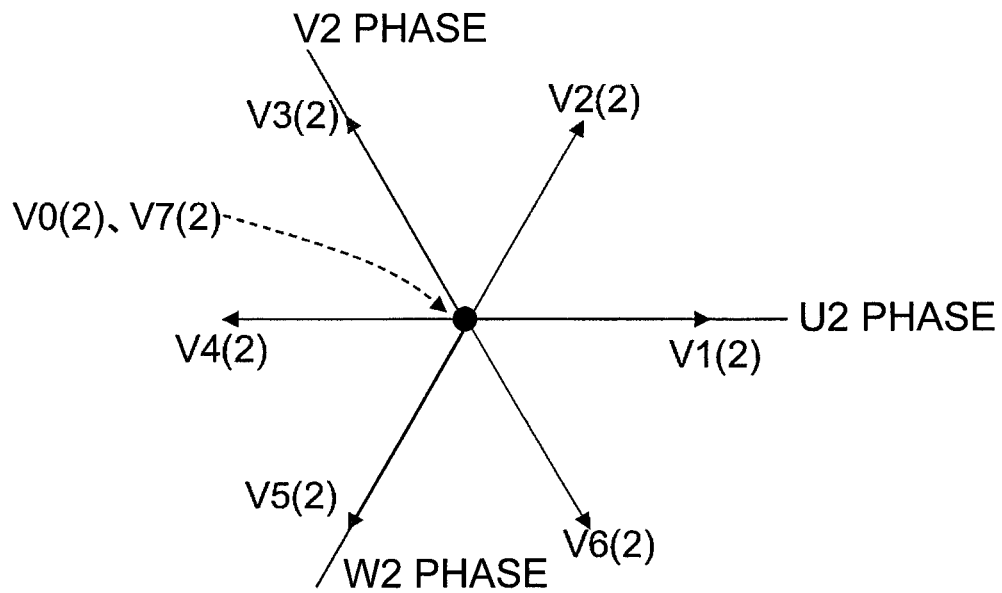
FIG. 9 is a diagram for illustrating voltage vectors V0 (2) to V7 (2) of FIG. 8.

A description is now given of the voltage vectors. FIG. 8 is a table for showing voltage vectors to be output so as to correspond to patterns of the on/off signals Qup2 to Qwn2 in the first embodiment of the present invention. FIG. 9 is a diagram for illustrating the voltage vectors V0(2) to V7(2) of FIG. 8.

As shown in FIG. 8, the voltage vector is a voltage vector determined so as to correspond to the patterns of the on/off signals Qup2 to Qwn2. The voltage vectors V0(2) to V7(2) of FIG. 8 are illustrated as in FIG. 9. As illustrated in FIG. 9, the voltage vectors V1(2) to V6(2) are effective voltage vectors having magnitudes arranged at every phase difference of 60 degrees. The voltage vectors V0(2) and V7(2) are zero-voltage vectors without a magnitude.

Figure 10:
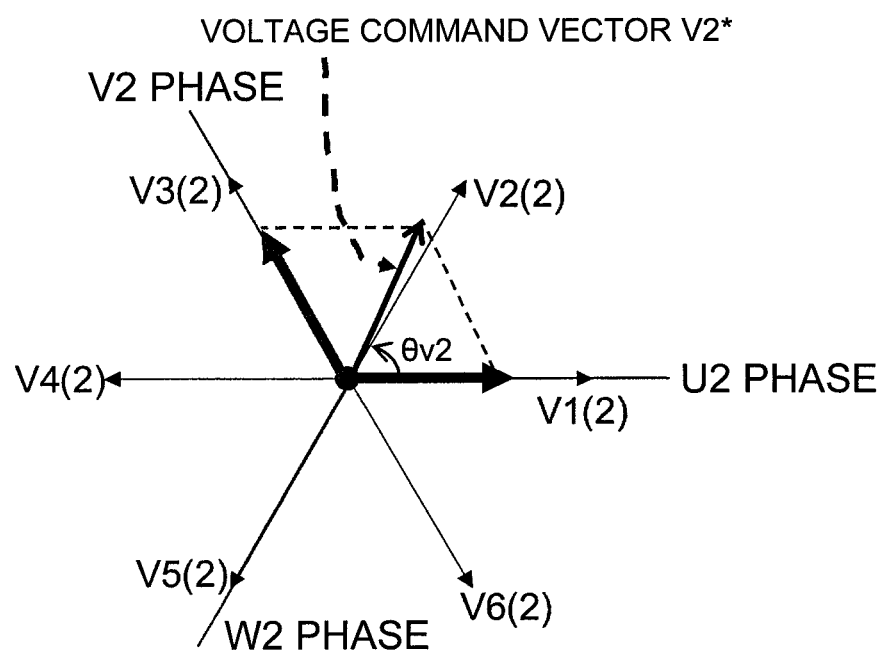
FIG. 10 is a diagram for illustrating the voltage vectors to be output when the phase θv2 of the voltage command vector V2* is equal to or larger than 30 degrees and smaller than 90 degrees in the first embodiment of the present invention.

A description of the operation of the on/off signal generator 15b is continuously given. FIG. 10 is a diagram for illustrating the voltage vectors to be output when the phase θv2 of the voltage command vector V2* is equal to or larger than 30 degrees and smaller than 90 degrees in the first embodiment of the present invention. In FIG. 10, the phase θv2 is approximately 62 degrees.

When the phase θv2 is equal to or larger than 30 degrees and smaller than 90 degrees, the voltage vector closest in phase to the voltage command vector V2* is the voltage vector V2(2) as illustrated in FIG. 10. In this case, the output voltage vectors are the second closest voltage vector V3 (2) and the third closest voltage vector V1(2) in phase to the voltage command vector V2*.

Output periods of the voltage vectors V1 (2) and V3 (2) are adjusted so that a resultant vector formed by the voltages V1 (2) and V3(2) matches the voltage command vector V2*. In this case, the voltage command vector V2* is calculated through use of the voltage command values Vu2, Vv2, and Vw2 as given by the following Expression (1-2).

$$V2^* = 0.8166 \times (Vu2 + a \times Vv2 + a^2 \times Vw2) \quad (1\text{-}2)$$

In Expression (1-2), $a = \exp(j \times 120)$ and $j^2 = -1$.

The on/off signal generator 15b thus calculates the voltage command vector V2* as given by Expression (1-2). The on/off signal generator 15b adjusts the magnitudes of the voltage vectors V1 (2) and V3 (2) so that the resultant vector of those voltage vectors matches the voltage command vector V2*.

As a specific example, duty values for the respective voltage vectors to be output so as to correspond to the phase θv2 of the voltage command vector V2* are shown in FIG. 11. FIG. 11 is a table for showing the duties of the voltage vectors to be output so as to correspond to the phase θv2 of the voltage command vector V2* in the first embodiment of the present invention.

In FIG. 11, $V_{\alpha(2)}$ and $V_{\beta(2)}$ are voltages obtained by expressing the voltage command values Vu2, Vv2, and Vw2 on stationary two axes. An α axis matches the U2-phase axis. A β axis is advanced in phase by 90 degrees with respect to the α axis. $D_{1(2)}$, $D_{2(2)}$, $D_{3(2)}$, $D_{4(2)}$, $D_{5(2)}$, and $D_{6(2)}$ are output duties corresponding to the voltage vectors V1 (2), V2 (2), V3 (2), V4 (2), V5 (2), and V6 (2), respectively.

For example, when a control cycle is Ts, and the phase θv2 of the voltage command vector V2* is equal to or larger than 30 degrees, and is smaller than 90 degrees, the respective output periods of the voltage vectors are only required to be set to $D_{1(2)} \times Ts$ for the voltage V1 (2), $D_{3(2)} \times Ts$ for the voltage V3 (2), and $(1 - D_{1(2)} - D_{3(2)}) \times Ts$ for the zero voltage vector, namely, the voltage vector V0 (2) or V7 (2). The same applies to the cases in which the conditions of the phase θv2 are different.

As described above, the control unit formed of the controller 8a and the controller 8b is configured to calculate the voltage command values Vu1 to Vw1 and Vu2 to Vw2, which are the command values of the three-phase AC voltages output from the respective inverters 6a and 6b, based on the input control command values. The control unit is configured to output the on/off signals Qup1 to Qwn1 and Qup2 to Qwn2 for switching on and off the respective semiconductor switching elements Sup1 to Swn1 and Sup2 to Swn2 of the respective inverters 6a and 6b in accordance with the voltage command values Vu1 to Vw1 and Vu2 to Vw2 calculated for the respective inverters 6a and 6b.

Moreover, the control unit is configured to output the on/off signals Qup1 to Qwn1 and Qup2 to Qwn2 to the respective inverters 6a and 6b so that, out of the plurality of voltage vectors V0 (1) to V7 (1) and V0 (2) to V7 (2) defined so as to correspond to the patterns of the on/off signals Qup1 to Qwn1 and Qup2 to Qwn2, the second closest voltage vectors and the third closest voltage vectors in phase to the voltage command vectors V1* and V2* based on the voltage command values Vu1 to Vw1 and the Vu2 to Vw2 are formed.

A description is now given of an effect achieved as a result of selecting and outputting the second closest voltage vector and the third closest voltage vector in phase to the voltage command vector V1*.

First, a description is given of a relationship between the respective voltage vectors and the inverter input current Iin1 input to the inverter 6a. In FIG. 3 described above, the inverter input current Iin1 corresponds to the voltage vector shown in the 7th column, and is shown in the 8th column. As shown in FIG. 3, when each of the zero voltage vectors V0 (1) and V7(1) is output, the inverter input current Iin1 is 0. Moreover, when each of the effective voltage vectors V1(1) to V6(1) is output, the inverter input current Iin1 is equal to one current value out of the currents Iu1, Iv1, and Iw1, or a value obtained by inverting the sign of this current.

Figure 12:
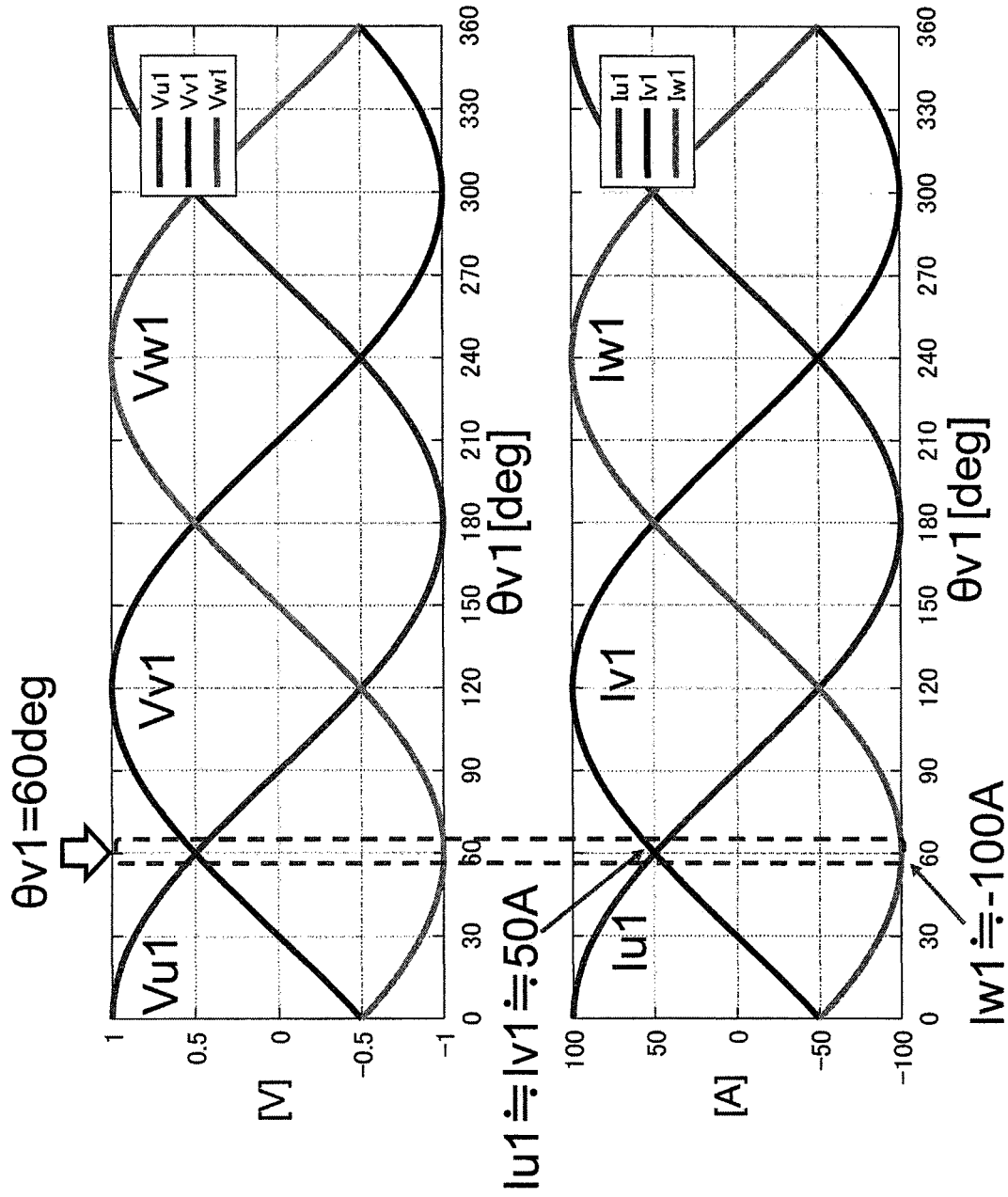
FIG. 12 is graphs for showing waveforms of voltage command values Vu1, Vv1, and Vw1, and currents Iu1, Iv1, and Iw1 in the first embodiment of the present invention.

FIG. 12 is graphs for showing waveforms of the voltage command values Vu1, Vv1, and Vw1, and the currents Iu1, Iv1, and Iw1 in the first embodiment of the present invention. In FIG. 12, there are shown waveforms exhibited when the amplitudes of the currents Iu1, Iv1, and Iw1 are 100 A, and the amplitudes of the voltage command values Vu1, Vv1, and Vw1 are 1 V.

As illustrated in FIG. 5, when the phase θv1 of the voltage command vector V1* is approximately 62 degrees, the currents Iu1, Iv1, and Iw1 are approximately 50 A, 50 A, and −100 A, respectively, as shown in the frame of the broken lines in the bottom graph of FIG. 12.

Figure 13:
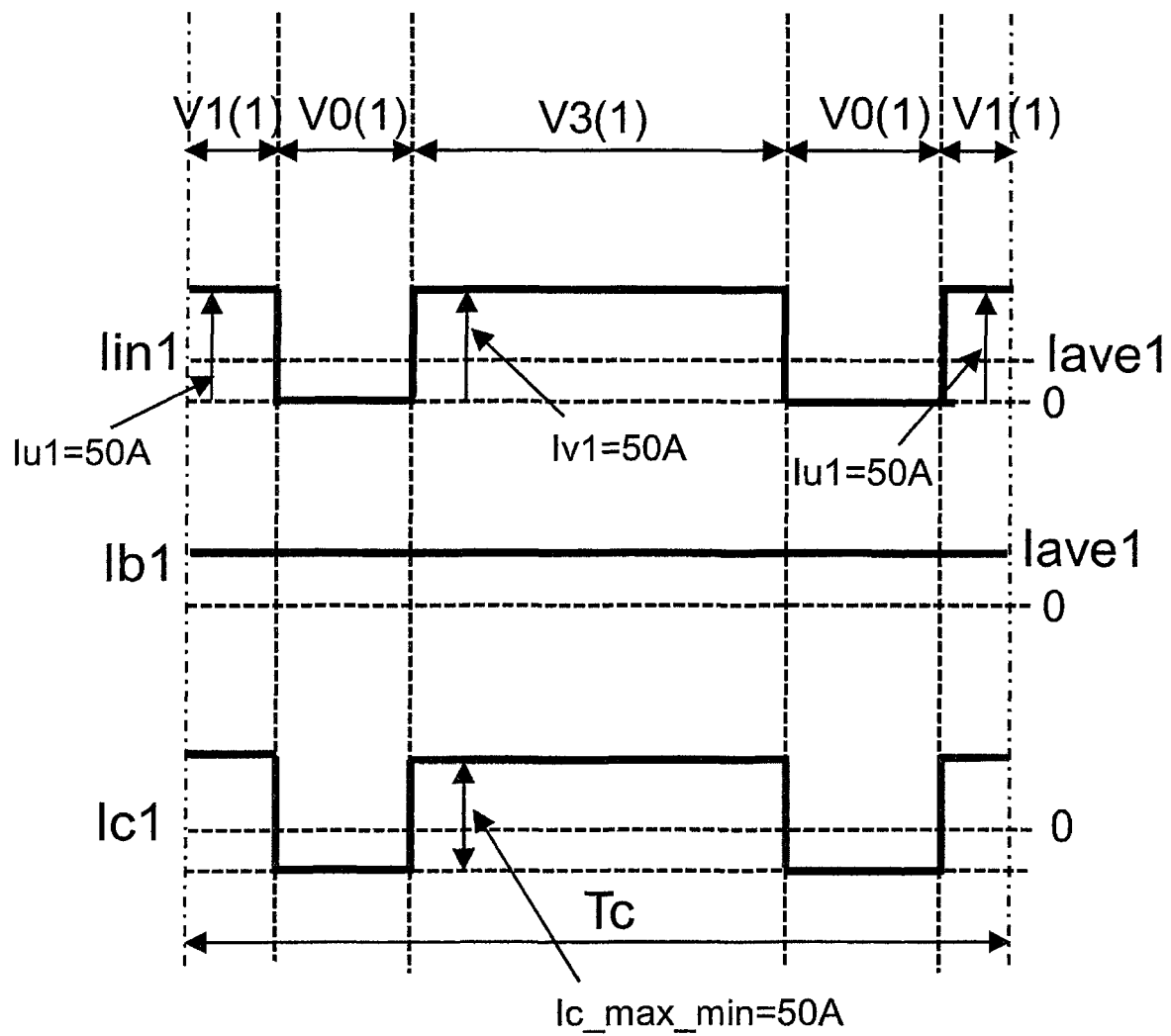
FIG. 13 is a graph for showing a waveform of a capacitor current Ic1 exhibited when the phase θv1 of the voltage command vector V1* is equal to or larger than 30 degrees and smaller than 90 degrees in the first embodiment of the present invention.

When the phase θv1 of the voltage command vector V1* is approximately 62 degrees in this case, the voltage vectors V1(1) and V3(1) are output as shown in FIG. 2. FIG. 13 is a graph for showing a waveform of a capacitor current Ic1 exhibited when the phase θv1 of the voltage command vector V1* is equal to or larger than 30 degrees and smaller than 90 degrees in the first embodiment of the present invention. In FIG. 13, waveforms of the inverter input current Iin1 and the DC current Ib1 are also shown.

As shown in FIG. 13, the controller 8a switches and outputs, for example, the voltage vectors V1(1), V0(1), V3(1), V0(1), and V1(1) including the zero voltage vector V0(1) in the stated order in the control cycle Tc. In this case, the inverter input current Iin1 changes in an order of Iu1, 0, Iv1, 0, and Iu1 as the voltage vectors change.

The inverter input current Iin1 is the current to be input to the inverter 6a as illustrated in FIG. 1, and is a synthetic current of the DC current Ib1 and the capacitor current Ic1. As illustrated in FIG. 1, a path passing through the DC power supply 3 and a path passing through the capacitor 4a are in parallel with each other as viewed from the inverter 6a.

The inductance 5 exists on the DC power supply 3 side, and hence the impedance on the DC power supply 3 side is indicated as ωL, where ω represents an angular frequency and L represents an inductance value. The impedance value is proportional to ω, and hence the impedance value is low for a low frequency component, and high for a high frequency component.

The impedance on the capacitor 4a side is indicated as $1/\omega C1$, where w represents the angular frequency and C1 represents a capacitance value. The impedance value is inversely proportional to ω, and hence the impedance value is low for a high frequency component, and high for a low frequency component.

From the description given above, the low frequency component of the inverter input current Iin1 corresponds to the DC current Ib1, and the high frequency component thereof corresponds to the capacitor current Ic1. Thus, as shown in FIG. 13, an average value Iave1 of the inverter input current Iin1 corresponds to the DC current Ib1, and a fluctuation component of the inverter input current Iin1 excluding the average value Iave1 corresponds to the capacitor current Ic1. Therefore, as shown in FIG. 13, the maximum value Ic max min of the fluctuation of the capacitor current Ic1 is 50 A.

Figure 14:
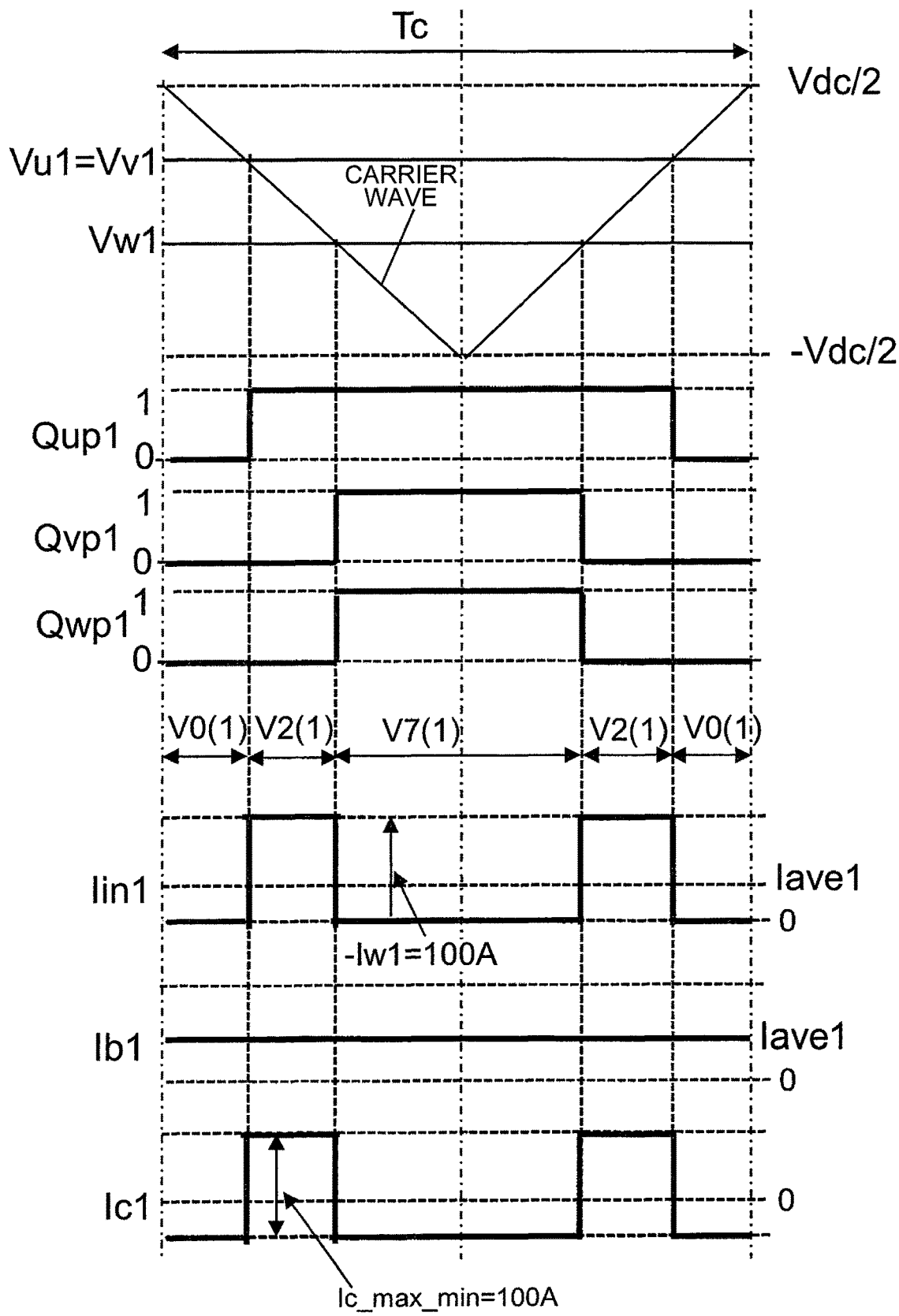
FIG. 14 is a graph for showing a comparative example of FIG. 13.

A description is now given of a change in the capacitor current Ic1 exhibited when the general triangular wave comparing type PWM control is executed. FIG. 14 is a graph for showing a comparative example of FIG. 13. In FIG. 14, waveforms of the inverter input current Iin1, the DC current Ib1, the voltage command values Vu1 to Vw1, and the on/off signals Qup1 to Qwp1 are also shown. Waveforms of the on/off signals Qun1 to Qwn1 are obtained by inverting the waveforms of the on/off signals Qup1 to Qwp1, and are thus not shown.

As shown in FIG. 14, patterns of the on/off signals Qup1 to Qwn1 are generated by comparing the voltage command values Vu1 to Vw1 and a carrier triangular wave corresponding to the carrier wave with each other. Specifically, when the voltage command values Vu1 to Vw1 are larger than the value of the carrier wave, the values of the on/off signals Qup1 to Qwp1 are 1, and otherwise, the values of the on/off signals Qup1 to Qwn1 are 0.

When such PWM control is executed, the voltage vectors are output in an order of V0(1), V2(1), V7(1), V2(1), and V0(1) in the control cycle Tc. That is, the vector V2 (1) closest in phase to the voltage command vector V1* is output in such PWM control. In this case, the inverter input current Iin1 changes in an order of 0, −Iw1, 0, −Iw, and 0 as the voltage vectors change. Therefore, as shown in FIG. 14, the maximum value Ic max min of the fluctuation of the capacitor current Ic1 is 100 A.

As can be understood from the description given above, the switching control in the first embodiment can reduce the capacitor current more compared with the general triangular wave comparing type PWM control.

A description has been given of the controller 8a corresponding to the inverter 6a, but the same applies to the controller 8b corresponding to the inverter 6b. Thus, the capacitor current Ic2 of the capacitor 4b can be reduced as in the capacitor current Ic1 of the capacitor 4a.

A control method described in Patent Literature 1 and the control method in the first embodiment are compared with each other. The control method described in Patent Literature 1 differentiate center values of voltage command values, namely, average values, of the inverter 6a and the inverter 6b from each other, to thereby differentiate discharge timings of the two inverters from each other.

As a result, for example, when the voltage vectors of the inverter 6a are V1 (1) to V6(1), and the voltage vectors of the inverter 6b are the zero voltage vector, namely, V0(2) or V7(2), the following effect is provided. Specifically, the inverter input current Iin1 is equivalent to the currents output from three of the DC power supply 3, the capacitor 4a, and the capacitor 4b. As a result, there is provided such an effect that a discharge current per capacitor decreases. When the voltage vector is the zero voltage vector, Iin1≈0 and Iin2=0 for the inverter input currents Iin1 and Iin2.

Referring to FIG. 5, when Iin1=−Iw1 in the control method described in Patent Literature 1, that is, the voltage vector V2(1) is output, the inverter input current Iin1 is −Iw1 due to the capacitor currents Ic1 and Ic2 in addition to the DC current Ib. Thus, the amplitude of the capacitor current Ic1 can be reduced compared with the case in which the inverter input current Iin is −Iw1 due to the DC current Ib and the capacitor current Ic1.

However, in an actual implementation, as illustrated in FIG. 1, a parasitic inductance 100 exists in a path between the capacitor 4a and the capacitor 4b, and impedances of the relay 16a and the relay 16b further exist. Thus, the inverter input current Iin1 is not supplied equally from two capacitors of the capacitor 4a and the capacitor 4b.

The capacitor current Ic2 discharged from the capacitor 4b to the inverter 6a is limited by the impedance of the parasitic inductance 100, and the impedances of the relay 16a and the relay 16b. As a result, the capacitor current Ic1 discharged from the capacitor 4a is larger than the capacitor current Ic2.

Further, when the inverter 6b fails, and the controller 8b thus opens the relay 16b, the path of the current from the capacitor 4b to the inverter 6a is cut off. Thus, the inverter input current Iin1 is caused by the capacitor current Ic1 discharged from the capacitor 4a in addition to the DC current Ib. In this case, the effect of reducing the capacitor current Ic1 is not provided at all.

In contrast, the control method in the first embodiment is as described below. Specifically, as described above, the inverter input current Iin1 is reduced by outputting the second closest voltage vector in phase and the third closest voltage vector in phase to the voltage command vector V1* for controlling the inverter 6a. Similarly, the inverter input current Iin2 is reduced by outputting the second closest voltage vector in phase and the third closest voltage vector in phase to the voltage command vector V2* for controlling the inverter 6b.

Thus, the control method in the first embodiment can reduce the capacitor currents Ic1 and Ic2 without being influenced by the parasitic inductance 100 of the path between the capacitor 4a and the capacitor 4b, and the impedances of the relay 16a and the relay 16b. Therefore, the control method in the first embodiment has a larger effect of reducing the capacitor currents compared with the control method described in Patent Literature 1.

Further, for example, even when the relay 16b is opened due to a failure of the inverter 6b, the inverter input current Iin1 itself is reduced in the control method in the first embodiment, and hence the capacitor current Ic1 does not increase. Thus, even when one of the two inverters fails, and the operation of the motor 1 is continued only by the other inverter, there can be provided such a remarkable effect that the effect of reducing the capacitor currents can be continued by the control method in the first embodiment.

As described above, the power conversion device according to the first embodiment is configured to output the on/off signals to each of the inverters so that, out of the plurality of voltage vectors defined so as to correspond to the patterns of the on/off signals, the second closest voltage vector and the third closest voltage vector in phase to the voltage command vector are formed.

As a result, when the configuration in which the capacitors are individually provided for the respective two inverters is employed, the capacitor currents discharged from the capacitors can be reduced, which can consequently contribute to downsizing of the capacitors.

Second Embodiment

In a second embodiment of the present invention, a description is given of a power conversion device including the controller 8a and the controller 8b having configurations different from those in the first embodiment. In the second embodiment, a description is omitted for the same points as those of the first embodiment, and is mainly given of points different from the first embodiment.

Figure 15:
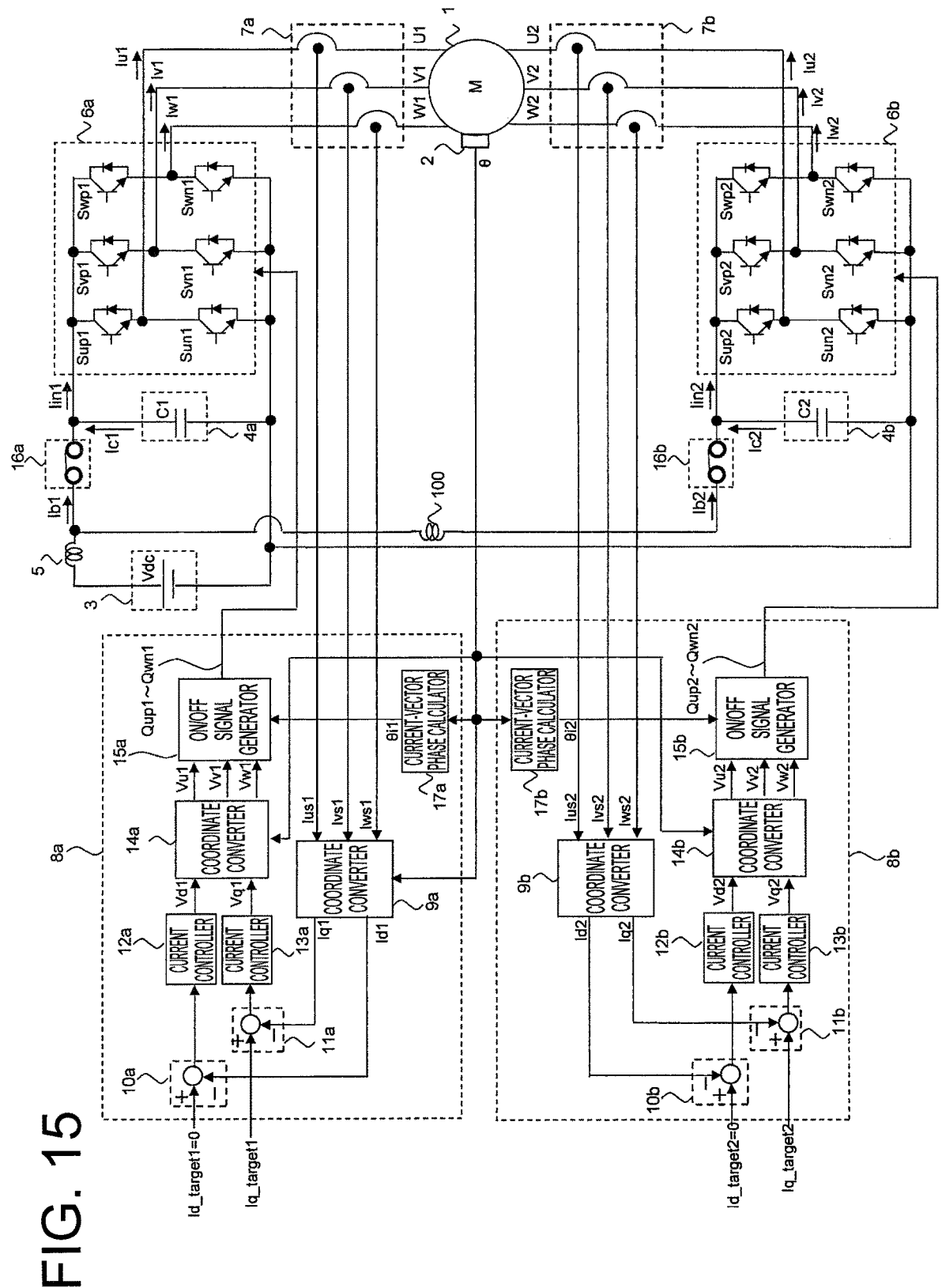
FIG. 15 is a diagram for illustrating an overall configuration of a power conversion device according to a second embodiment of the present invention.

FIG. 15 is a diagram for illustrating an overall configuration of the power conversion device according to the second embodiment of the present invention. As the difference from the configuration of the first embodiment, the power conversion device is configured as described below in the second embodiment.

Specifically, the controller 8a and the controller 8b further include a current-vector phase calculator 17a and a current-vector phase calculator 17b, respectively, and the operations of the on/off signal generator 15a and the on/off signal generator 15b are different. The same description applies to the controller 8a and the controller 8b in the second embodiment, and hence a description is now given of the configuration of the controller 8a as a representative configuration.

The current-vector phase calculator 17a is configured to calculate the phase θi1 of the current vector based on the rotation position θ input from the position detector 2 as given by the following Expression (2-1). In this case, a reference axis of the phase θi1 is the U1 phase (see FIG. 5).

$$\theta i1 = \theta + 90 (\text{deg}) \quad (2\text{-}1)$$

Expression (2-1) holds true when a permanent-magnet synchronous motor of non-salient type is used as the motor 1. When a permanent-magnet synchronous motor of salient type or an induction motor is used as the motor 1, the current-vector phase calculator 17a is only required to calculate the phase θi1 as given by the following Expression (2-2).

$$\theta i1 = \theta + a\ \tan(Iq1/Id1)(\text{deg}) \quad (2\text{-}2)$$

Further, the current-vector phase calculator 17a may use not the rotation position θ of the motor 1, but the current detection values Ius1, Ivs1, and Iws1, to thereby calculate the phase θi1 as given by the following Expression (2-3).

$$\theta i1 = a\ \tan\{(0.866 \times Ivs1 - 0.866 \times Iws1)/(Ius1 - 0.5 \times Ivs1 - 0.5 \times Iws1)\}(\text{deg}) \quad (2\text{-}3)$$

Moreover, the current-vector phase calculator 17a may use three-phase current command values obtained by applying coordinate conversion to the current command values Id_target1 and Iq_target1 in place of the current detection values Ius1, Ivs1, and Iws1, to thereby calculate the phase θi1 as given by the following Expression (2-3).

The current-vector phase calculator 17b is configured to calculate the phase θi2 of the current vector based on the rotation position θ input from the position detector 2 as given by the following Expression (2-4). In this case, a reference axis of the phase θi2 is the U2 phase (see FIG. 10).

$$\theta i2 = \theta + 90 (\text{deg}) \quad (2\text{-}4)$$

Expression (2-4) holds true when a permanent-magnet synchronous motor of non-salient type is used as the motor 1. When a permanent-magnet synchronous motor of salient type or an induction motor is used as the motor 1, the current-vector phase calculator 17b is only required to calculate the phase θi2 as given by the following Expression (2-5).

$$\theta i2 = \theta a\ \tan(Iq2/Id2)(\text{deg}) \quad (2\text{-}5)$$

Further, the current-vector phase calculator 17b may use not the rotation position θ of the motor 1, but the current detection values Ius2, Ivs2, and Iws2, to thereby calculate the phase θi2 as given by the following Expression (2-6).

$$\theta i2 = a\ \tan\{(0.866 \times Ivs2 - 0.866 \times Iws2)/(Ius2 - 0.5 \times Ivs2 - 0.5 \times Iws2)\}(\text{deg}) \quad (2\text{-}6)$$

Moreover, the current-vector phase calculator 17b may use three-phase current command values obtained by applying coordinate conversion to the current command values Id_target2 and Iq_target2 in place of the current detection values Ius2, Ivs2, and Iws2, to thereby calculate the phase θi2 as given by Expression (2-6).

The on/off signal generator 15a outputs the on/off signals Qup1 to Qwn1 based on the voltage command values Vu1, Vv1, and Vw1 input from the coordinate converter 14a and on the phase θi1 of the current vector input from the current-vector phase calculator 17a.

Figures 16, 17:
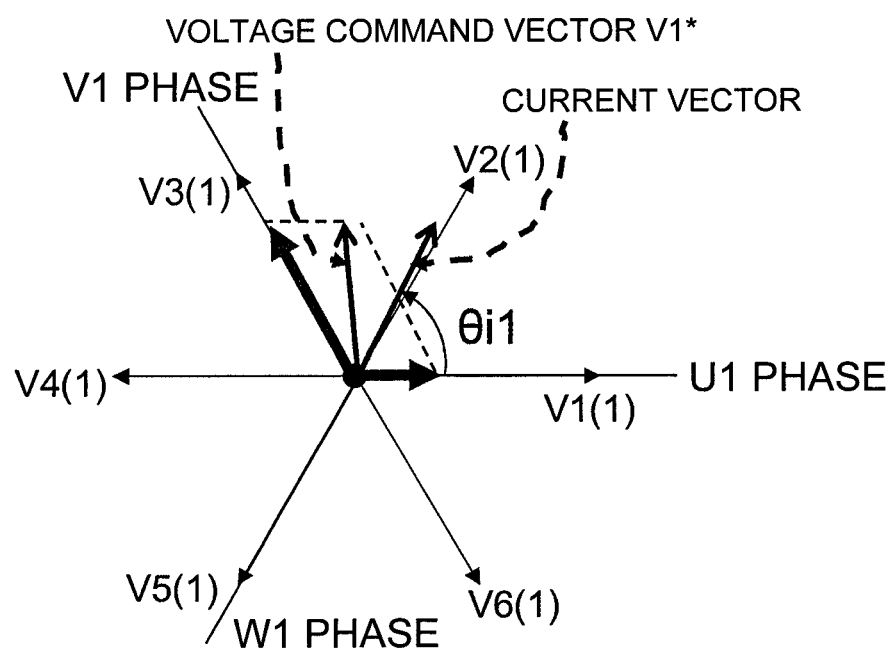
FIG. 16 is a table for showing the voltage vectors to be output so as to correspond to the phase θi1 of a current vector in the second embodiment of the present invention.
FIG. 17 is a diagram for illustrating the voltage vectors to be output when the phase θi1 of the current vector is equal to or larger than 30 degrees and smaller than 90 degrees in the second embodiment of the present invention.

A detailed description is now given of an operation of the on/off signal generator 15a. FIG. 16 is a table for showing voltage vectors to be output so as to correspond to the phase θi1 of the current vector in the second embodiment of the present invention.

As shown in FIG. 16, the on/off signal generator 15a selects and outputs two types of voltage vectors so as to correspond to the phase θi1 of the current vector. For example, when the phase θi1 is equal to or larger than 30 degrees, and smaller than 90 degrees, two types of voltage vectors V1(1) and V3(1) are selected. When the phase θi1 is equal to or larger than 90 degrees, and smaller than 150 degrees, two types of voltage vectors V2 (1) and V4 (1) are selected. As shown in FIG. 16, similarly, the on/off signal generator 15a selects two types of voltage vectors so as to correspond to the phase θi1.

It should be understood that the range of the phase θi1 of the current vector shown in FIG. 16 may be determined so as to correspond to a relationship in sign among the current detection values Ius1, Ivs1, and Iws1. For example, when there is such a relationship in sign that Ius1>0, Ivs1>0, and Iws1<0, the range of the phase θi1 can be determined so as to be 30<θi1<90. This is apparent also from FIG. 18 described later.

FIG. 17 is a diagram for illustrating the voltage vectors to be output when the phase θi1 of the current vector is equal to or larger than 30 degrees and smaller than 90 degrees in the second embodiment of the present invention. In FIG. 17, the phase θi1 is approximately 62 degrees.

When the phase θi1 is equal to or larger than 30 degrees and smaller than 90 degrees, the voltage vector closest in phase to the current vector is the voltage vector V2(1) as illustrated in FIG. 17. In this case, the output voltage vectors are the second closest voltage vector V3(1) and the third closest voltage vector V1(1) in phase to the current vector.

Output periods of the voltage vectors V1 (1) and V3 (1) are adjusted so that a resultant vector formed by the voltages V1 (1) and V3(1) matches the voltage command vector V1*.

As described above, the control unit formed of the controller 8a and the controller 8b is configured to output the on/off signals Qup1 to Qwn1 and Qup2 to Qwn2 to the respective inverters 6a and 6b so that, out of the plurality of voltage vectors V0 (1) to V7 (1) and V0 (2) to V7 (2) defined so as to correspond to the patterns of the on/off signals Qup1 to Qwn1 and Qup2 to Qwn2, the second closest voltage vectors and the third closest voltage vectors in phase to the current vectors based on the currents supplied as a result of the output of the three-phase AC voltages are formed.

A description is now given of an effect achieved as a result of selecting and outputting the second closest voltage vector and the third closest voltage vector in phase to the current vector.

Figure 18:
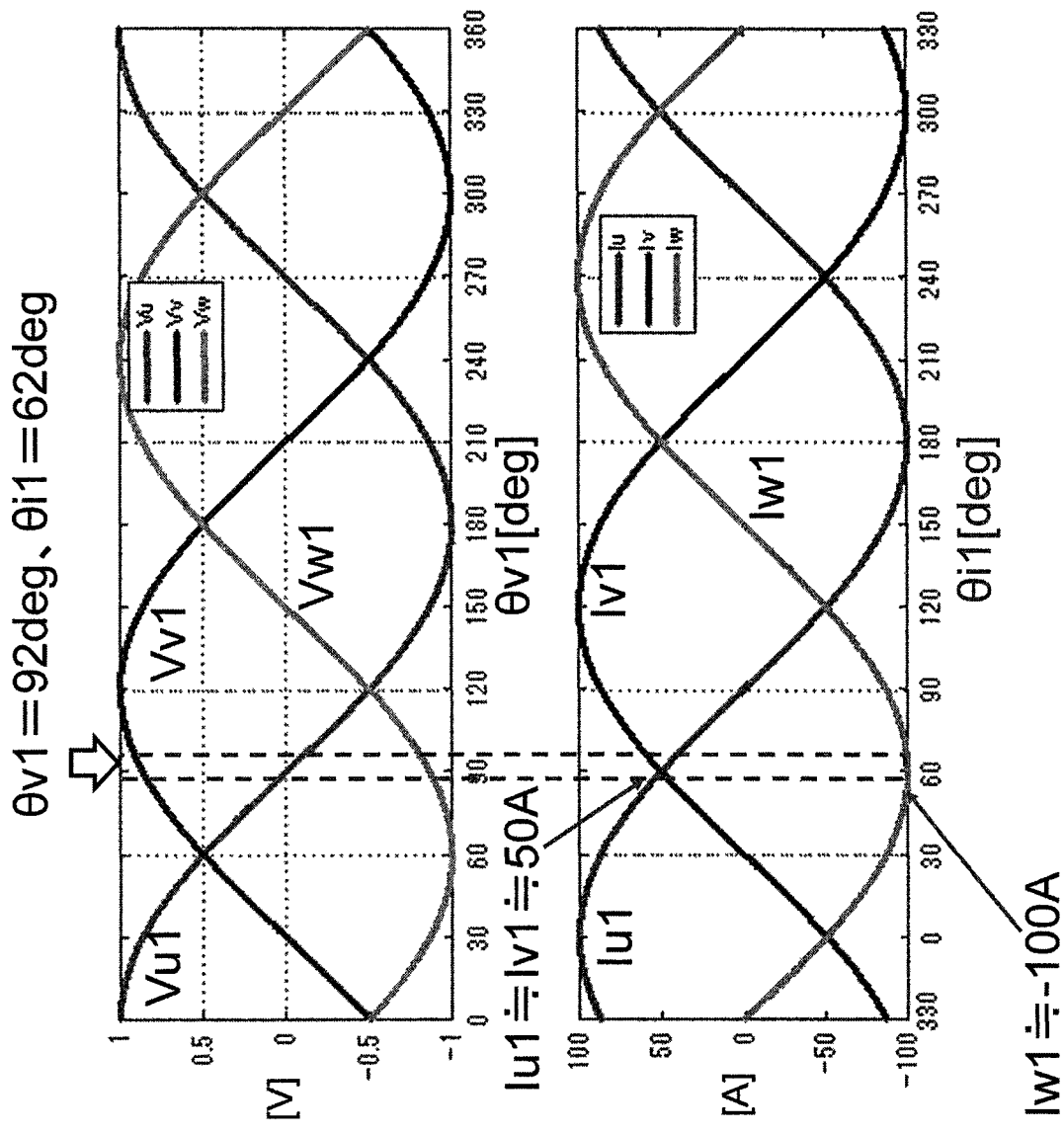
FIG. 18 is graphs for showing waveforms of voltage command values Vu1, Vv1, and Vw1, and currents Iu1, Iv1, and Iw1 in the second embodiment of the present invention.

FIG. 18 is graphs for showing waveforms of the voltage command values Vu1, Vv1, and Vw1, and the currents Iu1, Iv1, and Iw1 in the second embodiment of the present invention.

In FIG. 18, there are shown waveforms exhibited when the amplitudes of the currents Iu1, Iv1, and Iw1 are 100 A, and the amplitudes of the voltage command values Vu1, Vv1, and Vw1 are 1 V. The currents Iu1, Iv1, and Iw1 in the bottom graph have a phase lag of 30 degrees with respect to the voltage command values Vu1, Vv1, and Vw1 in the top graph, respectively. A power-factor angle is thus 30 degrees, which corresponds to $\cos(30) \approx 0.8666$ in power factor value.

As illustrated in FIG. 18, when the phase θi1 of the current vector is approximately 62 degrees, the currents Iu1, Iv1, and Iw1 are approximately 50 A, 50 A, and −100 A, respectively, as shown in the frame of the broken lines in the bottom graph of FIG. 18. In this case, the phase θv1 of the voltage command vector V1* is approximately 92 degrees.

The phase θi1 is approximately 62 degrees in this case, and hence the controller 8a outputs the voltage vectors V1(1) and V3(1) in accordance with the phase θi1 of the current vector as shown in FIG. 16. Moreover, in the control cycle Tc, the controller 8a switches and outputs, for example, the voltage vectors V1(1), V0(1), V3(1), V0(1), and V1(1) including the zero voltage vector V0(1) in the stated order.

In this case, the inverter input current Iin1 and the capacitor current Ic1 present the same changes as those in FIG. 13. Therefore, as can be found from FIG. 13 described above, the maximum value Ic max min of the fluctuation of the capacitor current Ic1 is 50 A.

A description is now given of a change in the capacitor current Ic1 exhibited when the control method in the first embodiment is applied when the phase θv1 of the voltage command vector V1* is equal to or larger than 90 degrees and smaller than 150 degrees as a comparative example. FIG. 19 is a graph for showing a comparative example of the control method in the second embodiment of the present invention. In FIG. 19, waveforms of the inverter input current Iin1 and the DC current Ib1 are also shown.

As described above, when the phase θi1 of the current vector is approximately 62 degrees, the phase θv1 of the voltage command vector V1* is approximately 92 degrees. Thus, when not the control method in the second embodiment but the control method in the first embodiment is applied, the following voltage vectors are output. Specifically, the second closest voltage vector V2 (1) and the third closest voltage vector V4(1) in phase to the voltage command vector V1* illustrated in FIG. 17 are selected and output.

In this case, as shown in FIG. 19, the voltage vectors V2 (1), V7 (1), V4 (1), V7 (1), and V2 (1) including the zero voltage vector V7(1) are switched and output in the stated order in the control cycle Tc.

Moreover, the inverter input current Iin1 changes in an order of −Iw1, 0, −Iu1, 0, and −Iw1 as the voltage vectors change. Therefore, as can be found from FIG. 19, the maximum value Ic max min of the fluctuation of the capacitor current Ic is 150 A.

Thus, when the power factor is smaller than 1, the capacitor currents can be reduced more by employing the control method in the second embodiment instead of the control method in the first embodiment.

As described above, the power conversion device according to the second embodiment is configured to output the on/off signals to each of the inverters that, out of the plurality of voltage vectors defined so as to correspond to the patterns of the on/off signals, the second closest voltage vector and the third closest voltage vector in phase to the current vector are formed. As a result, the capacitor currents can be reduced independently of the power factor compared with the control method in the first embodiment.

Third Embodiment

In a third embodiment of the present invention, a description is given of a power conversion device including the controller 8a and the controller 8b having configurations different from those in the second embodiment. In the third embodiment, a description is omitted for the same points as those of the first and second embodiments, and is mainly given of points different from the first and second embodiments.

As the difference from the configuration of the second embodiment, the power conversion device according to the third embodiment is configured as described below. Specifically, the operations of the on/off signal generator 15a and the on/off signal generator 15b are different. The same description applies to the controller 8a and the controller 8b in the third embodiment, and hence a description is now given of the configuration of the controller 8a as a representative configuration.

FIG. 20 is a table for showing a voltage modulation method to be employed so as to correspond to the phase θi1 of the current vector in the third embodiment of the present invention.

The voltage vector closest in phase to the current vector is shown in the second column of FIG. 20 so as to correspond to the range of the phase θi1 of the current vector shown in the first column. A voltage modulation method to be employed so as to correspond to the range of the phase θi1 of the current vector shown in the first column is shown in the third column of FIG. 20.

A "lower solid two-phase modulation" as used herein refers to a modulation method of equally shifting the voltage command values Vu1, Vv1, and Vw1 so that the smallest voltage command value out of the voltage command values Vu1, Vv1, and Vw1 matches the minimum value of the carrier wave. A section in which this modulation method is employed is defined as "lower solid two-phase modulation section".

Meanwhile, an "upper solid two-phase modulation" as used herein refers to a modulation method of equally shifting the voltage command values Vu1, Vv1, and Vw1 so that the largest voltage command value out of the voltage command values Vu1, Vv1, and Vw1 matches the maximum value of the carrier wave. A section in which this modulation method is employed is defined as "upper solid two-phase modulation section".

As shown in FIG. 20, the "lower solid two-phase modulation" is employed as the voltage modulation method when the voltage vectors closest in phase to the current vector are V2(1), V4(1), and V6(1). As can be found from FIG. 3, as a common point, the voltage vectors V2(1), V4(1), and V6(1) are voltage vectors formed by turning on the two semiconductor switching elements on the high electric potential side, and turning on the one semiconductor switching element on the low electric potential side.

Thus, in the third embodiment, when the voltage vector closest in phase to the current vector is the voltage vector formed by turning on the two semiconductor switching elements on the high electric potential side, and turning on the one semiconductor switching element on the low electric potential side, the "lower solid two-phase modulation" is employed as the voltage modulation method.

Meanwhile, as shown in FIG. 20, the "upper solid two-phase modulation" is employed as the voltage modulation method when the voltage vectors closest in phase to the current vector are V1 (1), V3 (1), and V5 (1). As can be found from FIG. 3, as a common point, the voltage vectors V1(1), V3(1), and V5(1) are voltage vectors formed by turning on one semiconductor switching element on the high electric potential side, and turning on the two semiconductor switching elements on the low electric potential side.

Thus, in the third embodiment, when the voltage vector closest in phase to the current vector is the voltage vector formed by turning on one semiconductor switching element on the high electric potential side, and turning on the two semiconductor switching elements on the low electric potential side, the "upper solid two-phase modulation" is employed as the voltage modulation method.

A "carrier wave inverted phase" shown in the fourth column of FIG. 20 means a phase in which a corresponding carrier wave is inverted with respect to a carrier wave corresponding to the other phase about the center of this carrier wave as a reference.

When the "lower solid two-phase modulation" is employed as the voltage modulation method, the carrier wave inverted phase is one phase out of the remaining two phases other than the minimum phase in which the voltage command value is the minimum out of the three phases. That is, the carrier wave corresponding to the one phase, which is the carrier wave inverted phase, is inverted with respect to the carrier wave corresponding to the other phase about the center of this carrier wave as the reference in the remaining two phases other than the minimum phase.

Meanwhile, when the "upper solid two-phase modulation" is employed as the voltage modulation method, the carrier wave inverted phase is one phase out of the remaining two phases other than the maximum phase in which the voltage command value is the maximum out of the three phases. That is, the carrier wave corresponding to the one phase, which is the carrier wave inverted phase, is inverted with respect to the carrier wave corresponding to the other phase about the center of this carrier wave as the reference in the remaining two phases other than the maximum phase.

As described above, the control unit formed of the controller 8a and the controller 8b is configured to compare the carrier wave and the voltage command values Vu1 to Vw1 and Vu2 to Vw2 with each other, to thereby output the on/off signals Qup1 to Qwn1 and Qup2 to Qwn2 to the respective inverters 6a and 6b.

When the control unit employs the "lower solid two-phase modulation", one phase is set as the carrier wave inverted phase, and the carrier wave in the carrier wave inverted phase is inverted about the center value as the reference with respect to the carrier wave in the other phase in the remaining two phases other than the minimum phase out of the three phases. Moreover, when the control unit employs the "upper solid two-phase modulation", one phase is set as the carrier wave inverted phase, and the carrier wave in the carrier wave inverted phase is inverted about the center value as the reference with respect to the carrier wave in the other phase in the remaining two phases other than the maximum phase out of the three phases.

A further description is now given of the operation of the controller 8a while giving a specific example. For example, consideration is given to the case in which the phase $\theta i1$ of the current vector is as illustrated in FIG. 17, and the waveforms of the voltage command values Vu1, Vv1, and Vw1 and the currents Iu1, Iv1, and Iw1 are as shown in FIG. 18.

Figure 21:
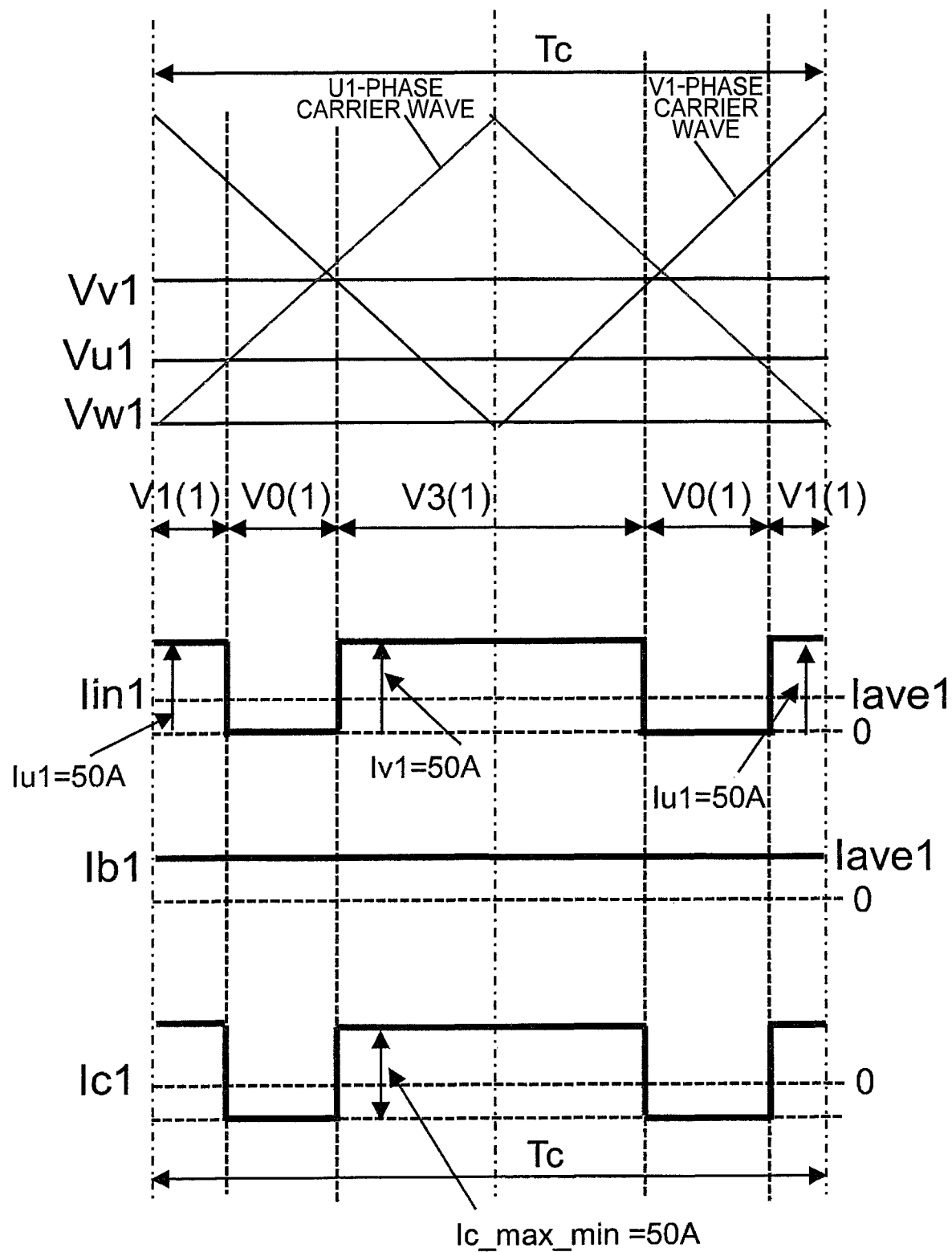
FIG. 21 is a graph for showing the waveform of the capacitor current Ic1 exhibited when the phase θi1 of the current vector is equal to or larger than 30 degrees and smaller than 90 degrees in the third embodiment of the present invention.

FIG. 21 is a graph for showing waveforms of the capacitor current Ic1 exhibited when the phase $\theta i1$ of the current vector is equal to or larger than 30 degrees and smaller than 90 degrees in the third embodiment of the present invention. In FIG. 21, waveforms of the voltage command values Vu1, Vv1, and Vw1, the inverter input current Iin1, and the DC current Ib1 are also shown.

In this case, the phase $\theta i$ of the current vector is approximately 62 degrees, and hence the "lower solid two-phase modulation" is employed as the voltage modulation method as can be understood from FIG. 20. Thus, the carrier wave inverted phase is any one of the U1 phase and the V1 phase other than the W1 phase, which is the minimum phase in which the voltage command value is the minimum, out of the three phases. That is, as shown in FIG. 21, the U1-phase carrier wave corresponding to the U1 phase is inverted with respect to the V1-phase carrier wave corresponding to the V1 phase about the center of the V1-phase carrier wave as the reference.

Moreover, as shown in FIG. 21, the maximum value Ic_max_min of the fluctuation of the capacitor current Ic1 is 50 A. Thus, the control method in the third embodiment provides the same effect as that of the control method in the second embodiment.

A description has been given of the operation of the on/off signal generator 15a as a representative operation, but the same applies to the on/off signal generator 15b of the controller 8b. FIG. 22 is a table for showing voltage modulation methods to be employed so as to correspond to the phase $\theta i2$ of the current vector in the third embodiment of the present invention.

That is, as shown in FIG. 22, also in the on/off signal generator 15b, the capacitor current Ic2 can be reduced as in the case of the capacitor current Ic1 by employing the voltage modulation method in accordance with the phase $\theta i2$ of the current vector.

The power conversion device according to the third embodiment is configured to set one phase out of the remaining two phases other than the minimum phase as the carrier wave inverted phase when the "lower solid two-phase modulation" is employed as the voltage modulation method, and set one phase out of the remaining two phases other than the maximum phase as the carrier wave inverted phase when the "upper solid two-phase modulation" is employed as the voltage modulation method. Even with this configuration, the same effect as that of the second embodiment is provided.

Fourth Embodiment

In a fourth embodiment of the present invention, a description is given of a power conversion device including the controller 8a and the controller 8b having configurations different from those in the third embodiment. In the fourth embodiment, a description is omitted for the same points as those of the first to third embodiments, and is mainly given of points different from the first to third embodiments.

As the difference from the configuration of the third embodiment, the power conversion device is configured as described below in the fourth embodiment. Specifically, the operation of the on/off signal generator 15a and the on/off signal generator 15b is different. Moreover, a sawtooth wave is employed as the carrier wave. The same description applies to the controller 8a and the controller 8b in the fourth embodiment, and hence a description is now given of the configuration of the controller 8a as a representative configuration.

FIG. 23 is a table for showing a voltage modulation method to be employed so as to correspond to the phase θi1 of the current vector in the fourth embodiment of the present invention. The voltage modulation method shown in the third column of FIG. 23 is employed so as to correspond to the range of the phase θi1 of the current vector shown in the first column as in FIG. 20.

Moreover, the carrier wave inverted phase shown in the fourth column of FIG. 23 is switched from one phase out of the two phases other than the minimum phase to the remaining one phase at the center of the range of the phase θi1 corresponding to the "lower solid two-phase modulation section". Similarly, the carrier wave inverted phase is switched from one phase out of the two phases other than the maximum phase to the remaining one phase at the center of the range of the phase θi1 corresponding to the "upper solid two-phase modulation section". In such a manner, the carrier wave inverted phase is switched each time the phase θi1 of the current vector changes by 30 degrees.

As described above, the control unit formed of the controller 8a and the controller 8b switches the carrier wave inverted phase from one phase to the other phase at the center of the "lower solid two-phase modulation section", in which the "lower solid two-phase modulation" is employed. Moreover, the control unit switches the carrier wave inverted phase from one phase to the other phase at the center of the "upper solid two-phase modulation section", in which the "upper solid two-phase modulation" is employed.

A further description is now given of the operation of the controller 8a while giving a specific example. For example, consideration is given to the case in which the phase θi1 of the current vector is as illustrated in FIG. 17, and the waveforms of the voltage command values Vu1, Vv1, and Vw1 and the currents Iu1, Iv1, and Iw1 are as shown in FIG. 18.

Figure 24:
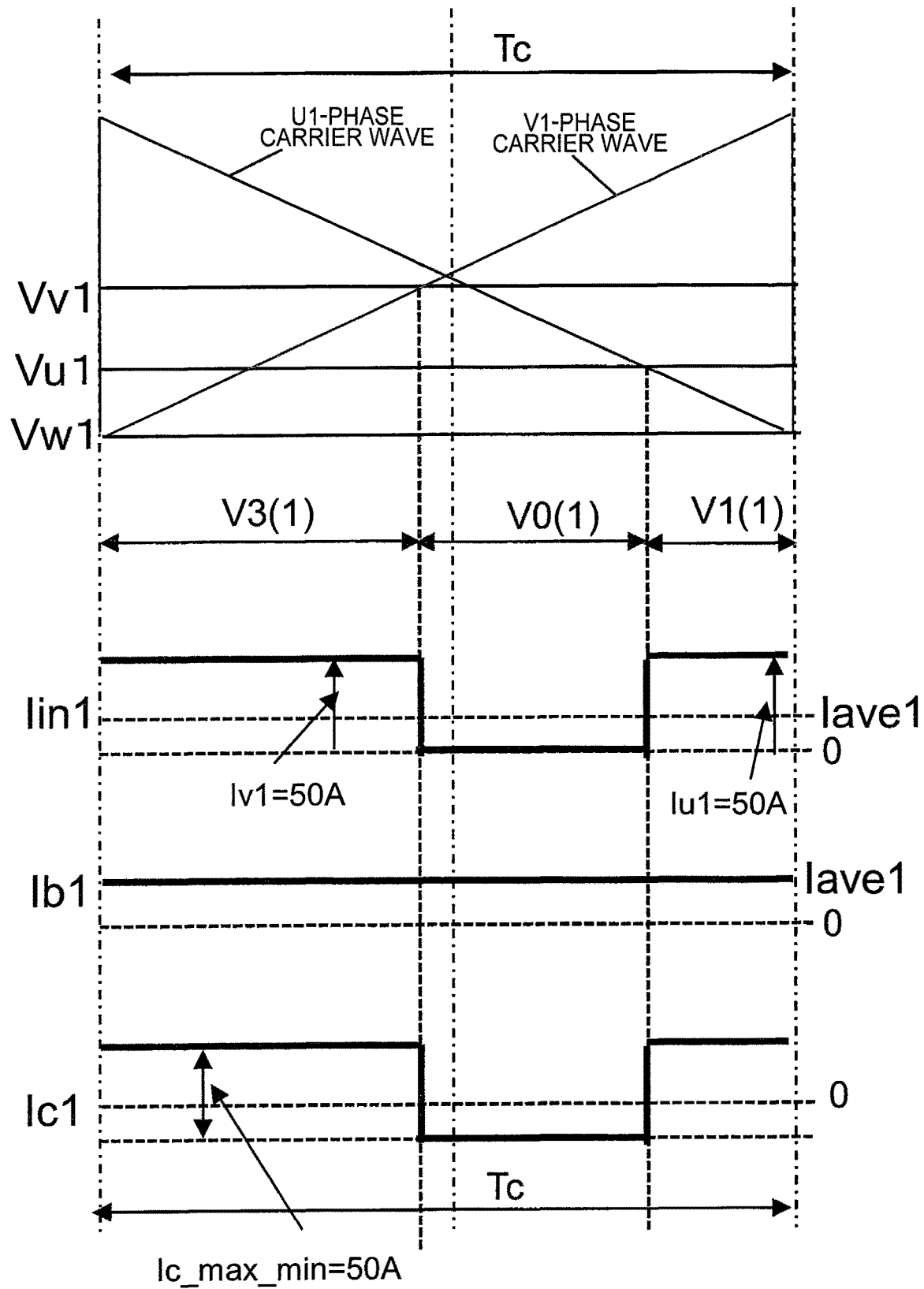
FIG. 24 is a graph for showing a waveform of the capacitor current Ic1 exhibited when the phase θi1 of the current vector is slightly smaller than 60 degrees in the fourth embodiment of the present invention.
Figure 25:
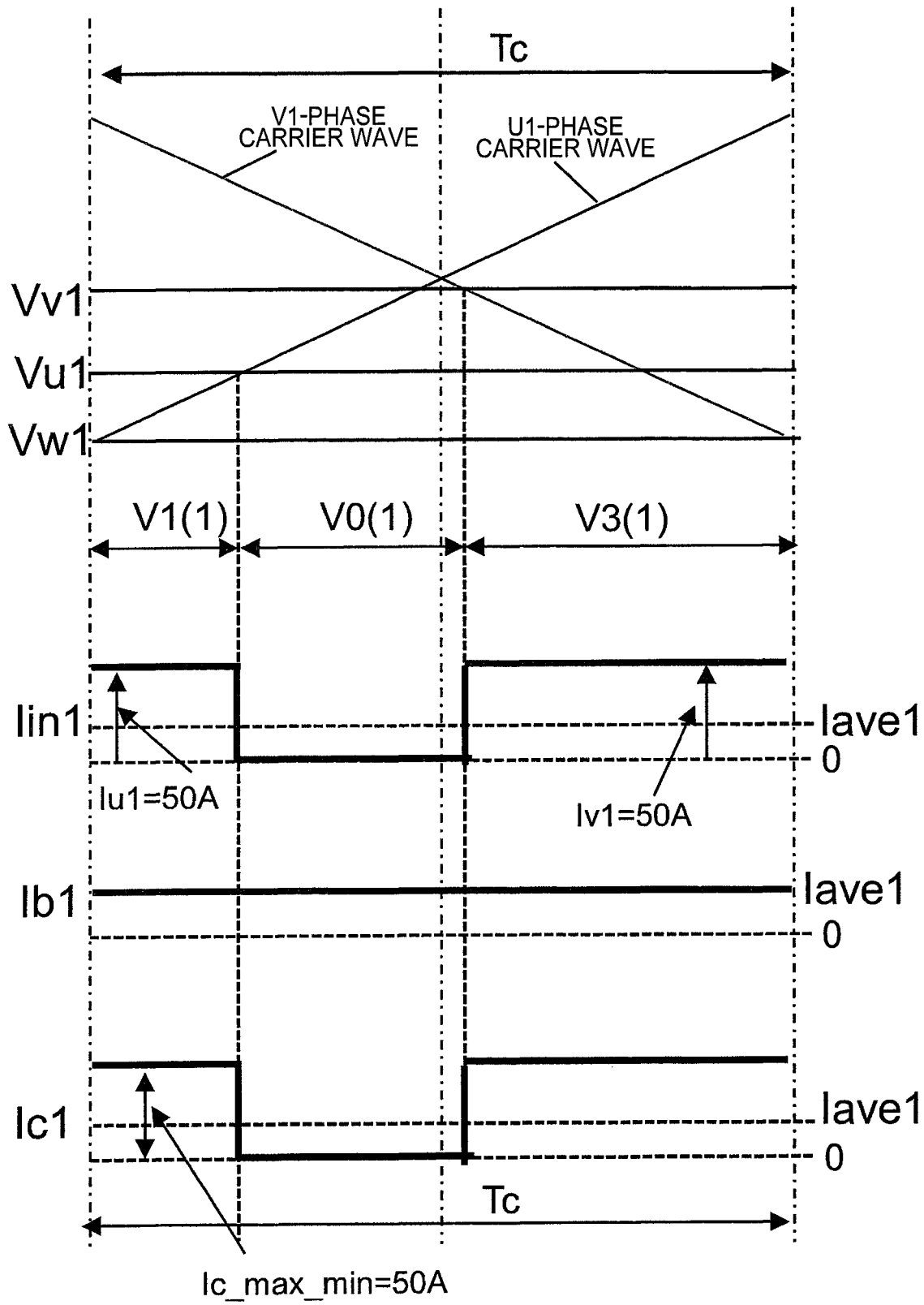
FIG. 25 is a graph for showing a waveform of the capacitor current Ic1 exhibited when the phase θi1 of the current vector is slightly larger than 60 degrees in the fourth embodiment of the present invention.

FIG. 24 is a graph for showing a waveform of the capacitor current Ic1 exhibited when the phase θi1 of the current vector is slightly smaller than 60 degrees in the fourth embodiment of the present invention. FIG. 25 is a graph for showing a waveform of the capacitor current Ic1 exhibited when the phase θi1 of the current vector is slightly larger than 60 degrees in the fourth embodiment of the present invention.

In FIG. 24 and FIG. 25, waveforms of the voltage command values Vu1, Vv1, and Vw1, the inverter input current Iin1, and the DC current Ib1 are also shown.

When the phase θi1 of the current vector is in the range equal to or larger than 30 degrees and smaller than 60 degrees, the "lower solid two-phase modulation" is employed as the voltage modulation method, and the sawtooth wave is further employed as the carrier wave, as can be understood from FIG. 23.

Moreover, the carrier wave inverted phase is any one of the U1 phase and the V1 phase other than the W1 phase, which is the minimum phase in which the voltage command value is the minimum, out of the three phases. That is, as shown in FIG. 24, the U1-phase carrier wave, which is a sawtooth wave decreasing rightward, is inverted with respect to the V1-phase carrier wave, which is a sawtooth wave increasing rightward, about the center of the V1-phase carrier wave as the reference.

Moreover, as shown in FIG. 24, the second closest voltage vector V1(1) and the third closest voltage vector V3(1) in phase are output to the current vector in the control cycle Tc. That is, in the control cycle Tc, the voltage vectors are output while being switched in an order of, for example, V3(1), V0(1), and V1 (1) including the zero voltage vector V0(1). In this case, the maximum value Ic max min of the fluctuation of the capacitor current Ic1 is 50 A.

Meanwhile, when the phase θi of the current vector is in the range equal to or larger than 60 degrees and smaller than 90 degrees, the "lower solid two-phase modulation" is employed as the voltage modulation method, and the sawtooth wave is further employed as the carrier wave, as can be understood from FIG. 23.

Moreover, the carrier wave inverted phase is switched from the U1 phase, which is one phase out of the two phases other than the W1 phase, which is the minimum phase, to the V1 phase, which is the remaining one phase. That is, the V1-phase carrier wave, which is a sawtooth wave decreasing rightward, is inverted with respect to the U1-phase carrier wave, which is a sawtooth wave increasing rightward, about the center of the U1-phase carrier wave as the reference.

Moreover, as shown in FIG. 25, the second closest voltage vector V3(1) and the third closest voltage vector V1(1) in phase are output to the current vector in the control cycle Tc. That is, in the control cycle Tc, the voltage vectors are output while being switched in an order of, for example, V1(1), V0(1), and V3 (1) including the zero voltage vector V0(1). In this case, the maximum value Ic max min of the fluctuation of the capacitor current Ic1 is 50 A.

As described above, the control method in the fourth embodiment provides the same effect as that of the control method in the third embodiment.

Figure 26:
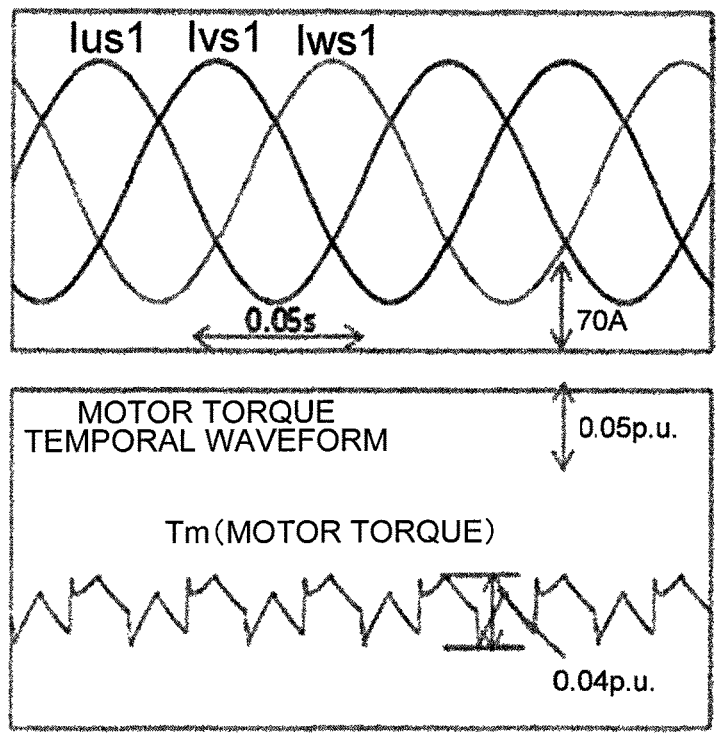
FIG. 26 is a graph for showing a waveform of a motor torque exhibited when a carrier wave inverted phase is switched each time the phase θi1 of the current vector changes by 30 degrees in the fourth embodiment of the present invention.
Figure 27:
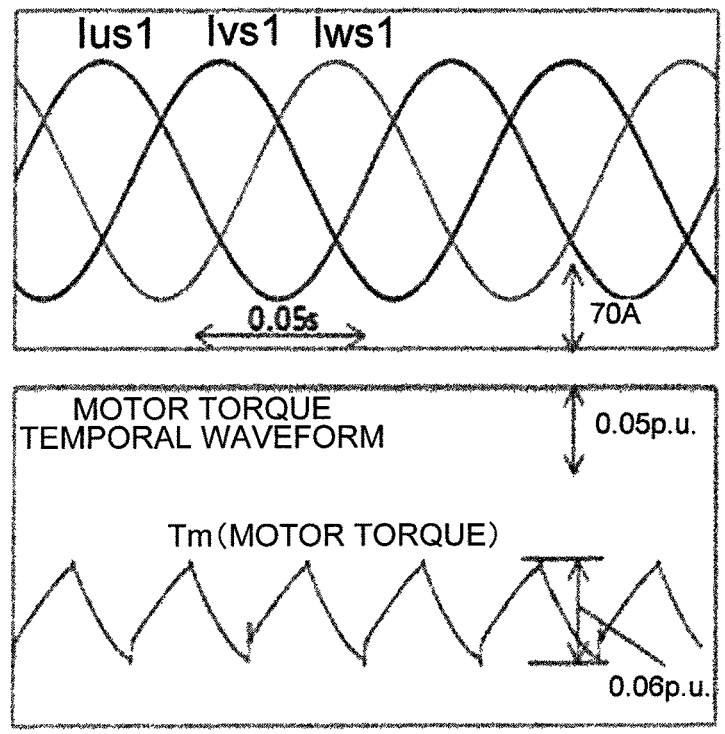
FIG. 27 is a graph for showing a comparative example of FIG. 26.

FIG. 26 is a graph for showing a waveform of a motor torque exhibited when the carrier wave inverted phase is switched each time the phase θi1 of the current vector changes by 30 degrees in the fourth embodiment of the present invention. FIG. 27 is a graph for showing a comparative example of FIG. 26.

In FIG. 27, there is shown as the comparative example a waveform of the motor torque exhibited when the carrier wave inverted phase is switched each time the phase θi1 of the current vector changes by 60 degrees as in the control method in the third embodiment. Moreover, in FIG. 26 and FIG. 27, waveforms of the current detection values Ius1, Ivs1, and Iws1 are also shown.

As shown in FIG. 26, when the carrier wave inverted phase switches each time the phase θi1 of the current vector changes by 30 degrees, pulsation of the motor torque is 0.04 p.u. Meanwhile, as shown in FIG. 27, when the carrier wave inverted phase switches each time the phase θi1 of the current vector changes by 60 degrees, pulsation of the motor torque is 0.06 p.u. Thus, the control method in the fourth embodiment provides an effect of suppressing ripple of the motor torque.

The power conversion device according to the fourth embodiment, compared with the configuration in the third embodiment, is configured so as to set the carrier waves as the sawtooth waves, switch the carrier wave inverted phase from one phase to the other phase at the center of the "lower solid two-phase modulation section", and switch the carrier wave inverted phase from one phase to the other phase at the center of the "upper solid two-phase modulation section". As a result, the same effect as that of the second embodiment is provided, and the ripple of the motor torque can be suppressed more.

Fifth Embodiment

In a fifth embodiment of the present invention, a description is given of a power conversion device including the controller 8a and the controller 8b having configurations different from those in the second to fourth embodiments. In the fifth embodiment, a description is omitted for the same points as those of the first to fourth embodiments, and is mainly given of points different from the first to fourth embodiments.

As the difference from the configuration of the second to fourth embodiments, in the power conversion device according to the fifth embodiment, the setting method for the carrier waves is different. The same description applies to the controller 8a and the controller 8b in the fourth embodiment, and hence a description is now given of the configuration of the controller 8a as a representative configuration.

In the fifth embodiment, the frequency of the carrier wave corresponding to a middle phase having the second largest voltage command value out of the three phases is set so as to be twice as high as the frequency of the carrier waves corresponding to the remaining two phases other than the middle phase.

As described above, the control unit formed of the controller 8a and the controller 8b is configured to compare the carrier wave and the voltage command values Vu1 to Vw1 and Vu2 to Vw2 with each other, to thereby output the on/off signals Qup1 to Qwn1 and Qup2 to Qwn2 to the respective inverters 6a and 6b. Moreover, the control unit sets the frequency of the carrier wave in the middle phase having the second largest voltage command value out of the three phases so as to be twice as high as the frequency of the carrier waves in the remaining two phases other than the middle phase.

A further description is now given of the operation of the controller 8a while giving a specific example. For example, consideration is given to the case in which the phase θi1 of the current vector is as illustrated in FIG. 17, and the waveforms of the voltage command values Vu1, Vv1, and Vw1 and the currents Iu1, Iv1, and Iw1 are as shown in FIG. 18.

Figure 28:
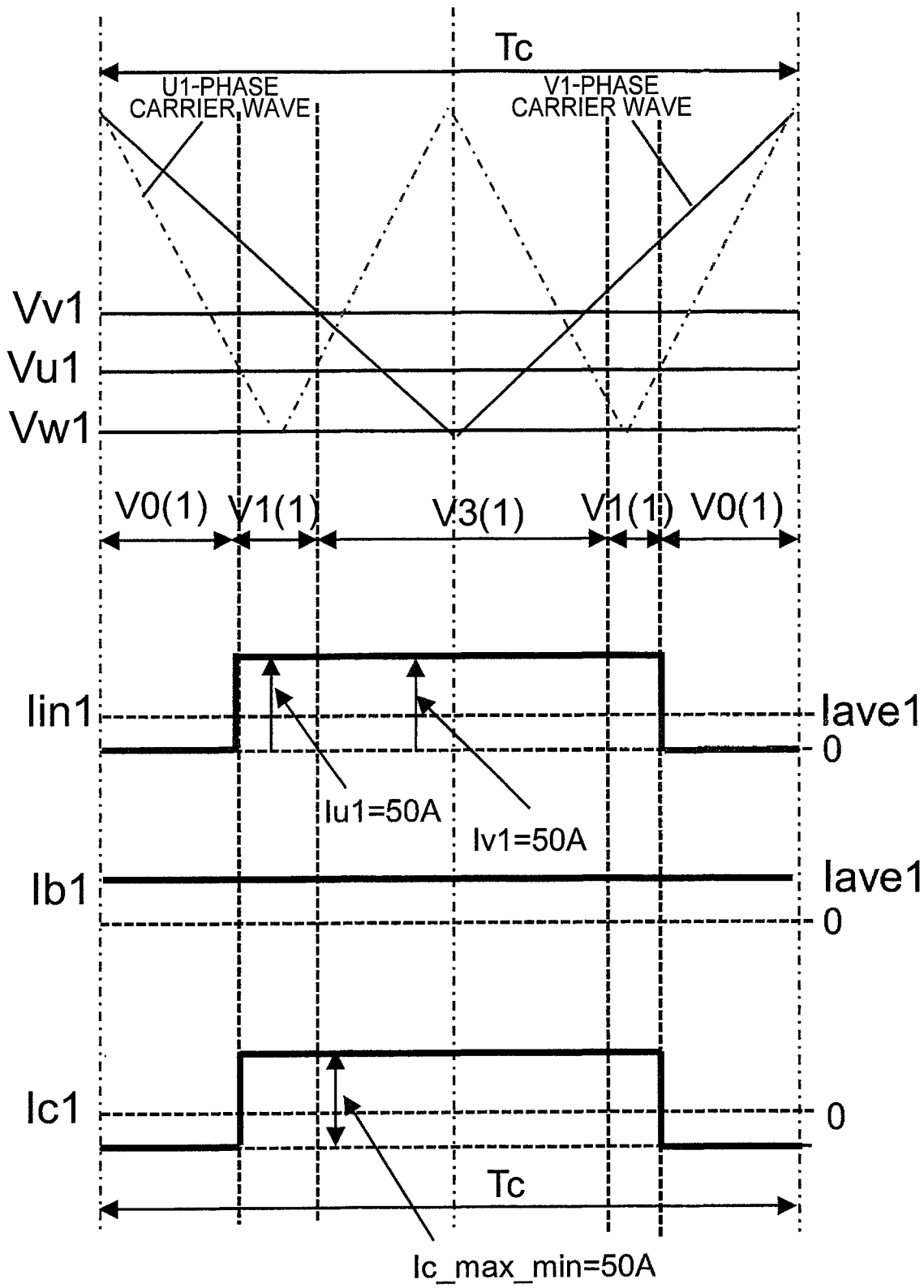
FIG. 28 is a graph for showing the waveform of the capacitor current Ic1 exhibited when the phase θi1 of the current vector is equal to or larger than 30 degrees and smaller than 90 degrees in a fifth embodiment of the present invention.

FIG. 28 is a graph for showing the waveform of the capacitor current Ic1 exhibited when the phase θi1 of the current vector is equal to or larger than 30 degrees and smaller than 90 degrees in the fifth embodiment of the present invention. In FIG. 28, waveforms of the voltage command values Vu1, Vv1, and Vw1, the inverter input current Iin1, and the DC current Ib1 are also shown.

In this case, a magnitude relationship among the voltage command values Vu1, Vv1, and Vw1 is given as Vv1>Vu1>Vw1, and hence the middle phase is the U1 phase. Thus, the controller 8a sets the frequency of the U1-phase carrier wave corresponding to the U1 phase so as to be twice as high as the frequency of the carrier waves corresponding to the remaining two phases.

Moreover, when the frequency of the U1-phase carrier wave is set so as to be twice as high as the frequency of the carrier waves corresponding to the remaining two phases, the maximum value Ic max min of the fluctuation of the capacitor current Ic1 is 50 A as shown in FIG. 21. Thus, the control method in the fifth embodiment provides the same effect as that of the control method in the second to fourth embodiments.

As described above, the power conversion device according to the fifth embodiment is configured so that, for each of the inverters, the frequency of the carrier wave in the middle phase is twice as high as the frequency of the carrier waves in the remaining two phases other than the middle phase. Even with this configuration, the same effect as that of the second embodiment is provided.

Sixth Embodiment

In a sixth embodiment of the present invention, a description is given of a power conversion device including the controller 8a and the controller 8b having configurations different from that in the second embodiment. In the sixth embodiment, a description is omitted for the same points as those of the first to fifth embodiments, and is mainly given of points different from the first to fifth embodiments.

Figure 29:
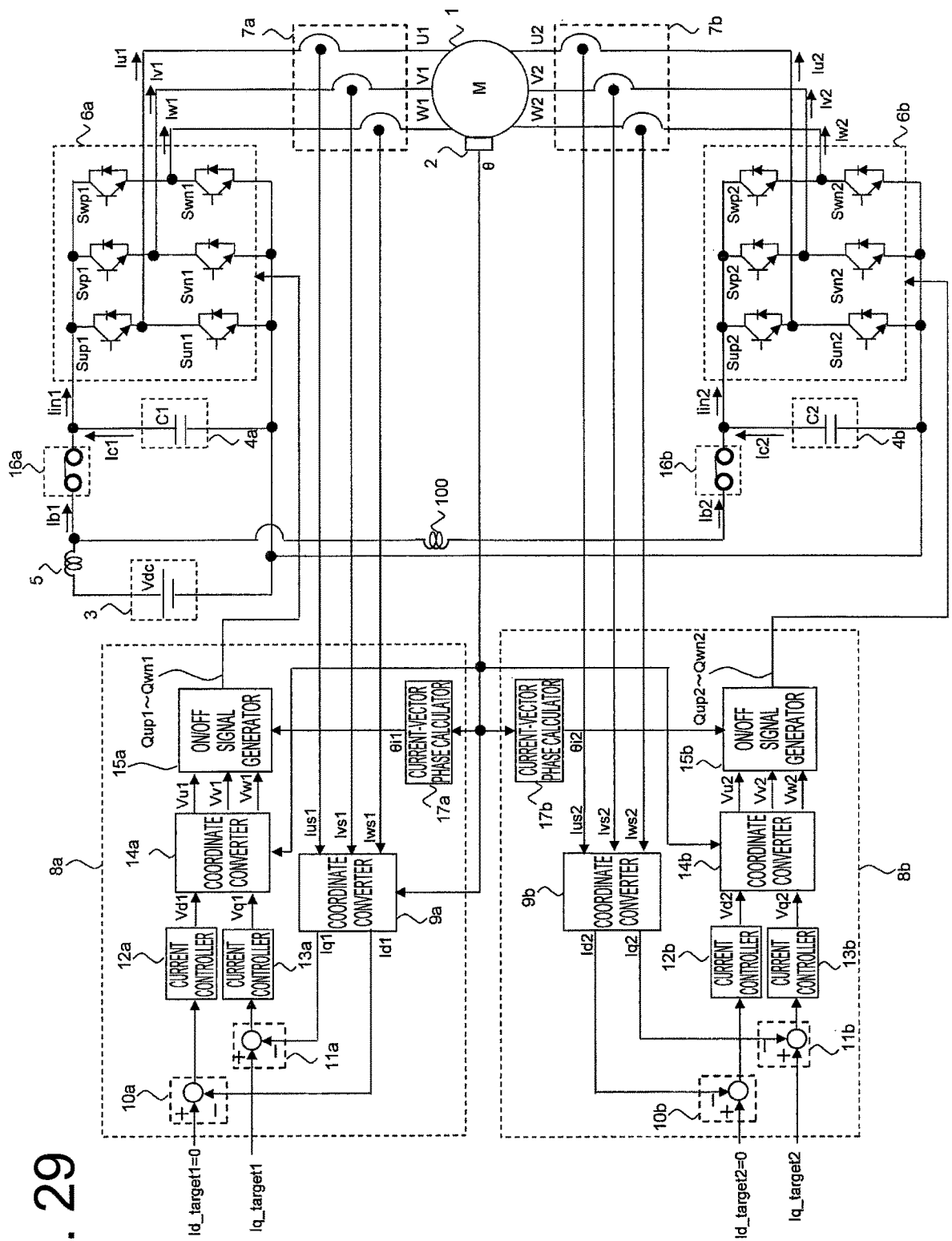
FIG. 29 is a diagram for illustrating an overall configuration of a power conversion device according to a sixth embodiment of the present invention.

FIG. 29 is a diagram for illustrating an overall configuration of the power conversion device according to the sixth embodiment of the present invention. As the difference from the configuration of the second embodiment, the power conversion device is configured as described below in the sixth embodiment. That is, the operations of the on/off signal generator 15a of the controller 8a and the on/off signal generator 15b of the controller 8b are different.

The on/off signal generator 15a uses different methods of generating the on/off signals Qup1 to Qwn1 between a case in which failures of the two inverters 6a and 6b are not detected and a case in which a failure of the inverter 6b is detected. Similarly, the on/off signal generator 15b uses different methods of generating the on/off signals Qup2 to Qwn2 between a case in which failures of the two inverters 6a and 6b are not detected and a case in which a failure of the inverter 6a is detected.

A description is now given of operations of the on/off signal generator 15a and the on/off signal generator 15b to be executed when failures of the two inverters are not detected.

Figure 30:
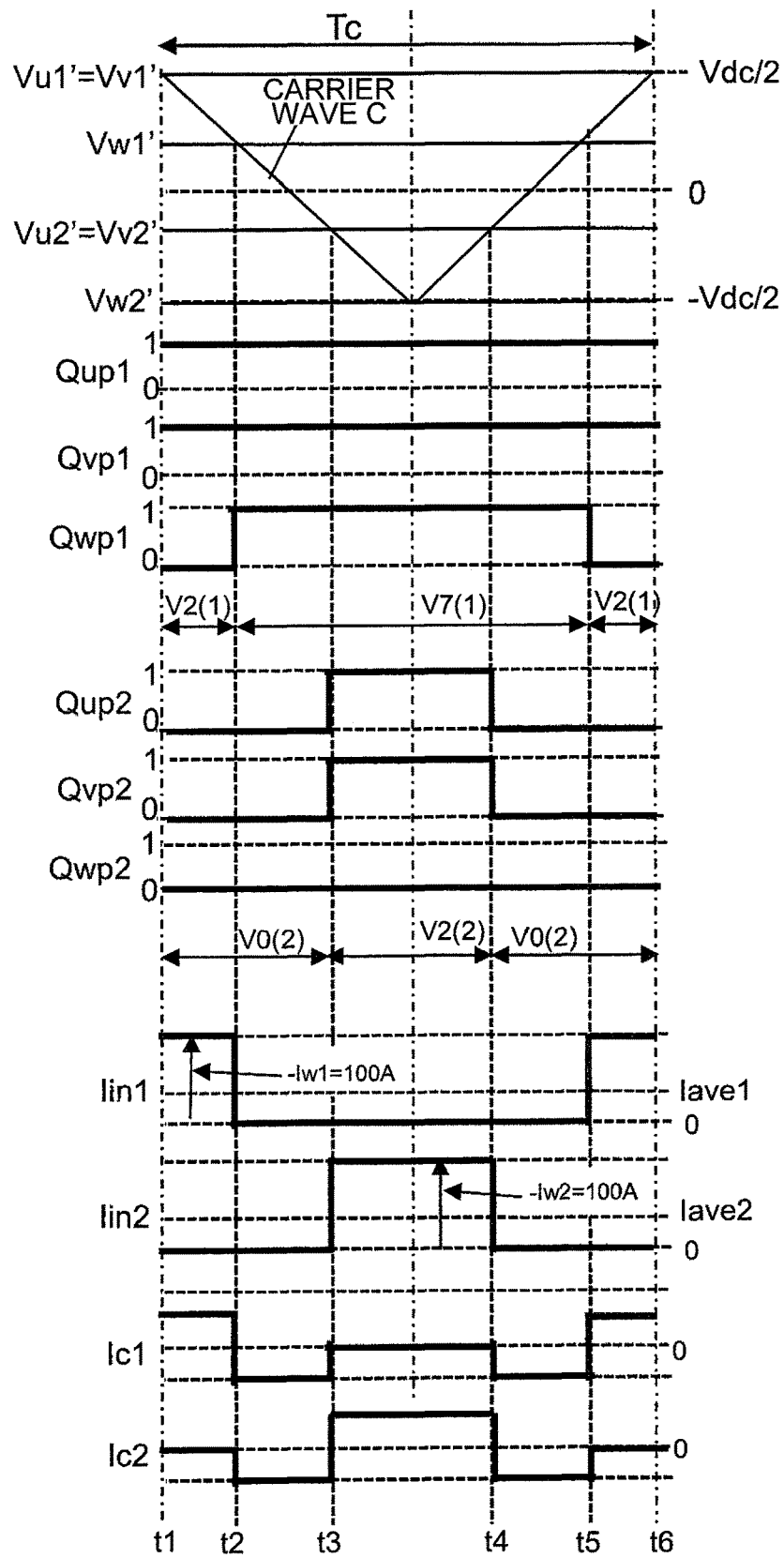
FIG. 30 is a graph for showing capacitor currents Ic1 and Ic2 exhibited when failures of the two inverters are not detected in the sixth embodiment of the present invention.

FIG. 30 is a graph for showing waveforms of the capacitor currents Ic1 and Ic2 exhibited when failures of the two inverters 6a and 6b are not detected in the sixth embodiment of the present invention. In FIG. 30, waveforms of the inverter input currents Iin1 and Iin2, the voltage command values Vu1' to Vw1' and Vu2' to Vw2', and the on/off signals Qup1 to Qwp1 and Qup2 to Qwp2 are also shown.

Figure 31:
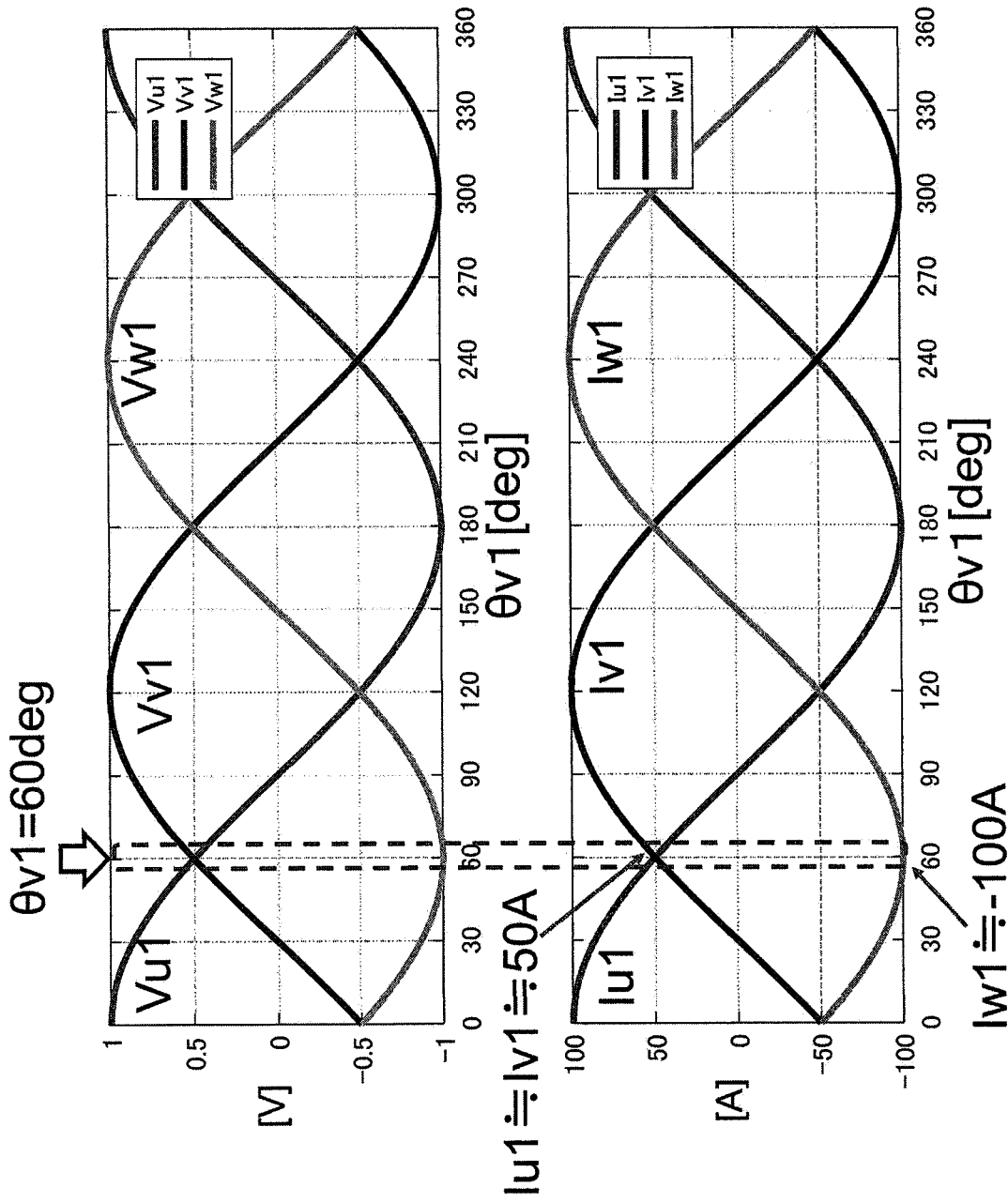
FIG. 31 is graphs for showing waveforms of voltage command values Vu1, Vv1, and Vw1, and currents Iu1, Iv1, and Iw1 in the sixth embodiment of the present invention.
Figure 32:
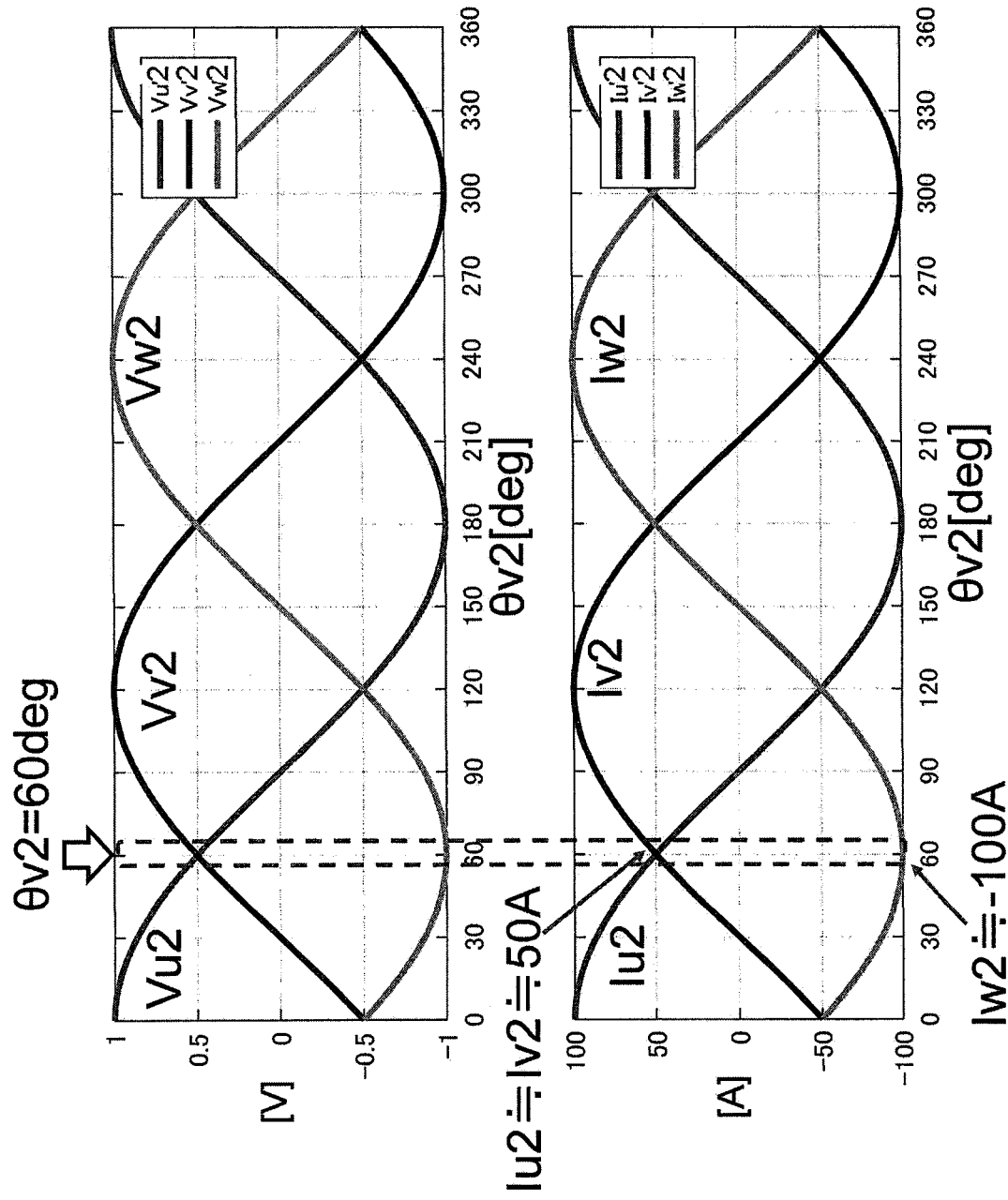
FIG. 32 is graphs for showing waveforms of voltage command values Vu2, Vv2, and Vw2, and currents Iu2, Iv2, and Iw2 in the sixth embodiment of the present invention.

FIG. 31 is graphs for showing waveforms of the voltage command values Vu1, Vv1, and Vw1, and the currents Iu1, Iv1, and Iw1 in the sixth embodiment of the present invention. FIG. 32 is graphs for showing waveforms of the voltage command values Vu2, Vv2, and Vw2, and the currents Iu2, Iv2, and Iw2 in the sixth embodiment of the present invention.

As a specific example, it is assumed that the voltage command values Vu1, Vv1, and Vw1, and the currents Iu1, Iv1, and Iw1 have instantaneous values shown in the frame of the broken lines of FIG. 31, and the voltage command values Vu2, Vv2, and Vw2, and the currents Iu2, Iv2, and Iw2 have instantaneous values shown in the frame of the broken lines of FIG. 32.

Moreover, carrier waves C are common, that is, are not different in phase, between the on/off signal generator 15a and the on/off signal generator 15b. Moreover, the maximum value, the minimum value, and a center value of the carrier wave C are Vdc/2, −Vdc/2, and 0, respectively.

In this case, the voltage command values Vu1, Vv1, and Vw1 are equally shifted so that the maximum value Vmax matches the maximum value Vdc/2 of the carrier wave through calculation given by the following Expressions (6-1) to (6-3), respectively. The maximum value Vmax is the maximum voltage command value of the voltage command values Vu1, Vv1, and Vw1.

$$Vu1'=Vu1+(Vdc/2-V\max) \quad (6\text{-}1)$$

$$Vv1'=Vv1+(Vdc/2-V\max) \quad (6\text{-}2)$$

$$Vw1'=Vw1+(Vdc/2-V\max) \quad (6\text{-}3)$$

Through the above-mentioned calculation, as shown in FIG. 30, the voltage command values Vu1, Vv1, and Vw1 are shifted to voltage command values Vu1', Vv1', and Vw1', which have an average value Vave1 larger than the center value 0 of the carrier wave C.

The voltage command values Vu1', Vv1', and Vw1' are compared with the carrier wave C. From a time point t1 to a time point t2, and from a time point t5 to a time point t6, Qup1=Qvp1=1, and Qwp1=0, and the voltage vector V2(1) is consequently output. Moreover, from the time point t2 to the time point t5, Qup1=Qvp1=Qwp1=1, and the voltage vector V7(1) is consequently output.

Meanwhile, the voltage command values Vu2, Vv2, and Vw2 are equally shifted so that the minimum value Vmin matches the minimum value −Vdc/2 of the carrier wave through calculation given by the following Expressions (6-4) to (6-6), respectively. The minimum value Vmin is the minimum voltage command value of the voltage command values Vu2, Vv2, and Vw2.

$$Vu2'=Vu2-(Vdc/2+V\min) \quad (6\text{-}4)$$

$$Vv2'=Vv2-(Vdc/2+V\min) \quad (6\text{-}5)$$

$$Vw2'=Vw2-(Vdc/2+V\min) \quad (6\text{-}6)$$

Through the above-mentioned calculation, as shown in FIG. 30, the voltage command values Vu2, Vv2, and Vw2 are shifted to voltage command values Vu2', Vv2', and Vw2', which have an average value Vave2 smaller than the center value 0 of the carrier wave C.

The voltage command values Vu2', Vv2', and Vw2' are compared with the carrier wave C. From the time point t1 to the time point t3, and from the time point t4 to the time point t6, Qup1=Qvp1=Qwp1=0, and the voltage vector V0(2) is consequently output. From the time point t3 to the time point t4, Qup1=Qvp1=1 and Qwp1=0, and the voltage vector V2(2) is consequently output.

Next, a description is given of the inverter input currents Iin1 and Iin2, and the capacitor currents Ic1 and Ic2.

In FIG. 30, from the time point t1 to the time point t2, and from the time point t5 to the time point t6, Iin1=100 A and Iin2=0 A. The voltage vector corresponding to the inverter 6a is an effective voltage vector. The voltage vector corresponding to the inverter 6b is a zero voltage vector. Thus, the capacitor current Ic1 and the capacitor current Ic2 are supplied to the inverter 6a. However, the capacitor current Ic2 is supplied to the inverter 6a through the parasitic inductance 100 and the relays 16a and 16b, and the value of the capacitor current Ic2 is thus smaller than that of the capacitor current Ic1.

From the time t2 to the time point t3, and from the time point t4 to the time point t5, Iin1=Iin2=0. The voltage vectors corresponding to the respective inverters 6a and 6b are zero voltage vectors. Thus, charge currents are supplied to the capacitors 4a and 4b from the DC power supply 3.

From the time point t3 to the time point t4, Iin1=0 A and Iin2=100 A. The voltage vector corresponding to the inverter 6a is a zero voltage vector. The voltage vector corresponding to the inverter 6b is an effective voltage vector. Thus, the capacitor current Ic1 and the capacitor current Ic2 are supplied to the inverter 6b. However, the capacitor current Ic1 is supplied to the inverter 6b through the parasitic inductance 100 and the relays 16a and 16b, and the value of the capacitor current Ic1 is thus smaller than that of the capacitor current Ic2.

As described above, from the time point t1 to the time point t2, from the time point t3 to the time point t4, and from the time point t5 to the time point t6, the voltage vector corresponding to one of the two inverters is an effective voltage vector, and the voltage vector corresponding to the other is a zero voltage vector. Thus, the two capacitors 4a and 4b supply the capacitor currents to the one inverter, and, as a result, the magnitude of the capacitor current supplied by the one capacitor can be reduced.

As described above, in the control method in the sixth embodiment, when failures of the two inverters 6a and 6b are not detected, the average value of the voltage command values in the three phases corresponding to one inverter is set so as to be larger than the center value of the carrier wave, and the average value of the voltage command values in the three phases corresponding to the remaining one inverter is set so as to be smaller than the center value of the carrier wave.

In other words, when failures of both of the two inverters 6a and 6b are not detected, the control unit formed of the controller 8a and the controller 8b executes control as described below. The control unit matches the phases of the carrier waves corresponding to the respective inverters 6a and 6b with each other. Moreover, the control unit sets the average value of the voltage command values calculated for one inverter out of the two inverters 6a and 6b so as to be larger than the center value of the carrier wave. Further, the control unit sets the average value of the voltage command values calculated for the other inverter so as to be smaller than the center value of the carrier wave.

Thus, for the voltage vectors corresponding to the two respective inverters, it is possible to generate the state in which the voltage vector corresponding to the one inverter is an effective voltage vector and the voltage vector corresponding to the other inverter is a zero voltage vector. As a result, the magnitude of the capacitor current supplied by the one capacitor can be reduced. Further, the effective voltage vectors corresponding to the two inverters are the voltage vectors V2(1) and V2(2). The voltage vectors V2(1) and V2(2) are the voltage vectors closest in phase to the voltage command vectors V1* and V2* in the ranges of the phases θv1 and θv2 shown in the frames of the broken lines of FIG. 31 and FIG. 32.

In such a manner, in the control method in the sixth embodiment, when failures of the two inverters 6a and 6b are not detected, the respective voltage vectors closest in phase to the voltage command vectors V1* and V2* are output, which is different from the control methods in the first to fifth embodiments. As a result, there is provided such an effect that ripples of the current supplied to the motor 1 can be reduced.

In other words, when failures of both of the two inverters 6a and 6b are not detected, the control unit formed of the controller 8a and the controller 8b executes control as described below. The control unit outputs the on/off signals Qup1 to Qwn1 and Qup2 to Qwn2 to the respective inverters 6a and 6b so that, out of the plurality of voltage vectors V0(1) to V7(1) and V0(2) to V7(2), the voltage vectors closest in phase to the voltage command vectors V1* and V2* are formed.

That is, when failures of the two inverters 6a and 6b are not detected, each of the controller 8a and the controller 8b executes the control so as to reduce a ratio of overlapping periods in which the effective voltage vectors are generated, to thereby reduce the capacitor currents and reduce the ripple current supplied to the motor 1.

In contrast, when one of the two inverters 6a and 6b fails, and the control method described above is directly applied, the following problem occurs. Specifically, the relay close to the failed inverter is opened, and hence the capacitor current from the capacitor close to the failed inverter is not supplied. As a result, and the capacitor current supplied from the remaining one capacitor disadvantageously increases.

For example, when Iin1≠0 and Iin2=0, and the relay 16b is closed, the capacitor currents Ic1 and Ic2 are supplied to the inverter 6a, and hence the magnitudes of the capacitor currents Ic1 and Ic2 are relatively small. However, when a failure of the inverter 6b is detected, and the relay 16b is opened, the capacitor current Ic2 is not supplied to the inverter 6a. In this case, the capacitor current Ic1 increases so as to compensate for an amount corresponding to the absence of the capacitor current Ic2. When the capacitors are designed in consideration of such a state, downsizing of the capacitors cannot be achieved.

In view of this, in the control method in the sixth embodiment, only when a failure of one of the two inverters 6a and 6b is detected, the control method in any one of the first to six embodiments is applied to the normal inverter. That is, as described in the first to fifth embodiments, the second closest voltage vector and the third closest voltage vector in phase to the voltage command vector or the current vector are output. Thus, fluctuations of the inverter input currents Iin1 and Iin2 themselves are reduced, and the capacitor currents are consequently reduced.

That is, when a failure of one of the two inverters 6a and 6b is detected, the controller corresponding to the other inverter outputs the on/off signals so that the second closest voltage vector and the third closest voltage vector in phase to the voltage command vector or the current vector are formed.

According to the power conversion device of the sixth embodiment described above, when the control unit does not detect failures of both of the two inverters, the power conversion device matches the phases of the carrier waves corresponding to the respective inverters with each other, sets the average value of the voltage command values calculated for one inverter out of the two inverters so as to be larger than the center value of the carrier wave, and sets the average value of the voltage command values calculated for the other inverter so as to be smaller than the center value of the carrier wave. As a result, the capacitor currents can be reduced both in the case in which the two inverters are normal and in the case in which any one of the two inverters fails.

Seventh Embodiment

In a seventh embodiment of the present invention, a description is given of a power conversion device including the controller 8a and the controller 8b having configurations different from those in the sixth embodiment. In the seventh embodiment, a description is omitted for the same points as those of the first to sixth embodiments, and is mainly given of points different from the first to sixth embodiments.

As the difference from the configuration of the sixth embodiment, the power conversion device is configured as described below in the seventh embodiment. Specifically, when failures of the two inverters 6a and 6b are not detected, the method of generating the on/off signals Qup1 to Qwn1 by the on/off signal generator 15a and the method of generating the on/off signals Qup2 to Qwn2 by the on/off signal generator 15b are different from each other.

Figure 33:
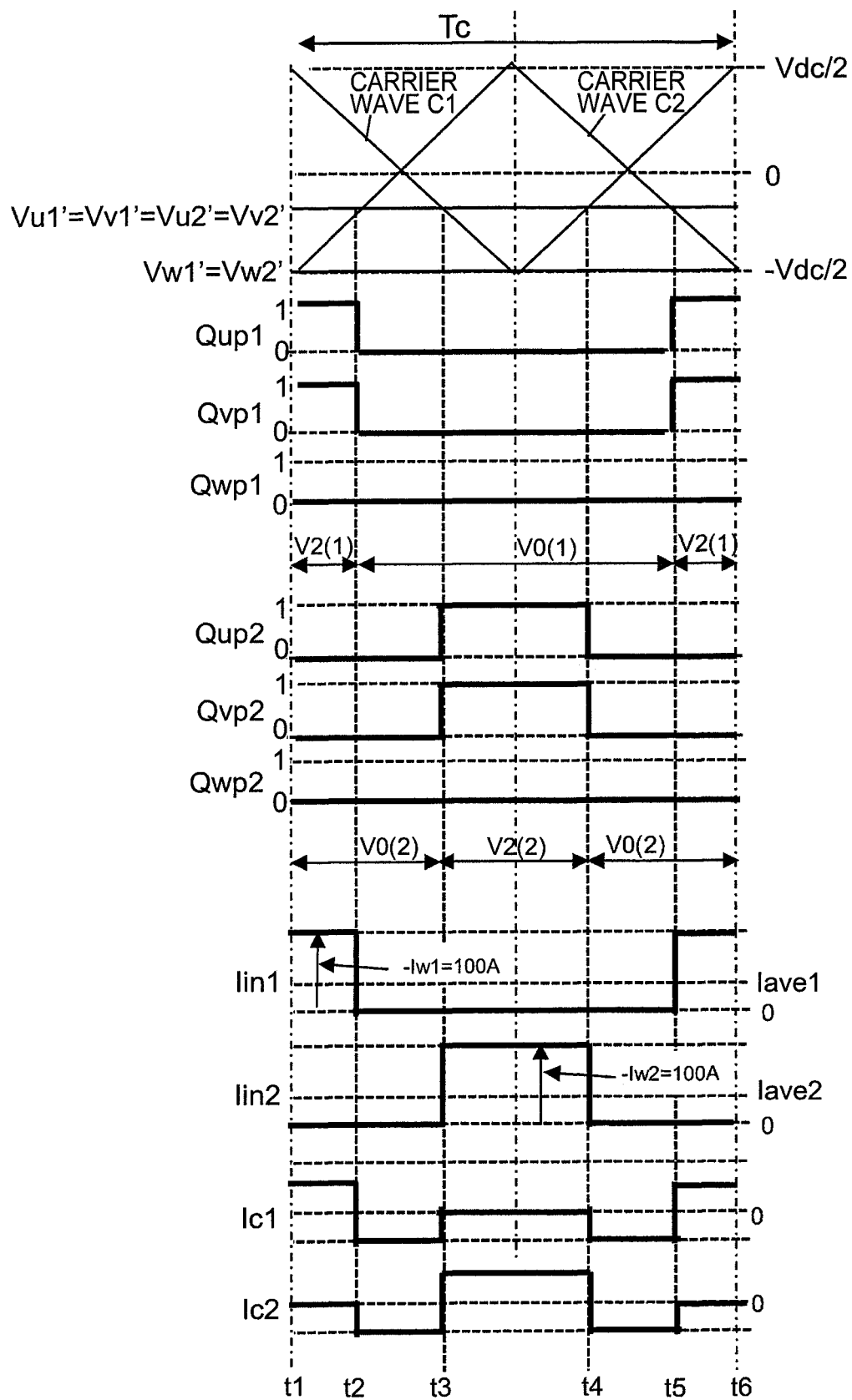
FIG. 33 is a graph for showing the capacitor currents Ic1 and Ic2 exhibited when the failures of the two inverters are not detected in a seventh embodiment of the present invention.

FIG. 33 is a graph for showing waveforms of the capacitor currents Ic1 and Ic2 exhibited when failures of the two inverters 6a and 6b are not detected in the seventh embodiment of the present invention. In FIG. 33, waveforms of the inverter input currents Iin1 and Iin2, the voltage command values Vu1' to Vw1' and Vu2' to Vw2', and the on/off signals Qup1 to Qwp1 and Qup2 to Qwp2 are also shown.

Compared with FIG. 30, two carrier waves are used in FIG. 33. The two carrier waves are a carrier wave C1 to be compared with the voltage command values Vu1', Vv1', and Vw1' and a carrier wave C2 to be compared with the voltage command values Vu2', Vv2', and Vw2'. The carrier wave C2 is the same as the carrier wave C shown in FIG. 30, and the carrier wave C1 is displaced in phase by 180 degrees with respect to the carrier wave C2 when the control cycle Tc corresponds to 360 degrees.

The voltage command values Vu1, Vv1, and Vw1 are equally shifted so that the minimum value Vmin matches the minimum value −Vdc/2 of the carrier wave through calculation given by the following Expressions (7-1) to (7-3), respectively.

$$Vu1'=Vu1-(Vdc/2+V\min) \tag{7-1}$$

$$Vv1'=Vv1-(Vdc/2+V\min) \tag{7-2}$$

$$Vw1'=Vw1-(Vdc/2+V\min) \tag{7-3}$$

Through the above-mentioned calculation, as shown in FIG. 33, the voltage command values Vu1, Vv1, and Vw1 are shifted to voltage command values Vu1', Vv1', and Vw1', which have an average value Vave1 smaller than the center value 0 of the carrier wave C1.

The voltage command values Vu1', Vv1', and Vw1' are compared with the carrier wave C1. From the time point t1 to the time point t2, and from the time point t5 to the time point t6, Qup1=Qvp1=1, and Qwp1=0, and the voltage vector V2(1) is consequently output. Moreover, from the time point t2 to the time point t5, Qup1=Qvp1=Qwp1=0, and the voltage vector V0(1) is consequently output.

Meanwhile, the voltage command values Vu2', Vv2', and Vw2' are calculated as given by Expressions (6-4) to (6-6) given above.

The voltage command values Vu2', Vv2', and Vw2' are compared with the carrier wave C2. From the time point t1 to the time point t3, and from the time point t4 to the time point t6, Qup2=Qvp2=Qwp2=0, and the voltage vector V0(2) is consequently output. Moreover, from the time point t3 to the time point t4, Qup2=Qvp2=1 and Qwp2=0, and the voltage vector V2 (2) is consequently output.

As described above, as shown in FIG. 33, a period in which the voltage vectors corresponding to the inverter 6a and the inverter 6b are simultaneously effective voltage vectors does not occur. Thus, as in the sixth embodiment described above, the capacitor currents Ic1 and Ic2 can be reduced.

As described above, in the control method in the seventh embodiment, when failures of the two inverters 6a and 6b are not detected, the phases of the carrier waves corresponding to the two inverters are set so as to be different from each other by 180 degrees, and both of the average value of the voltage command values Vu1, Vv1, and Vw1 in the three phases and the average value of the voltage command values Vu2, Vv2, and Vw2 in the three phases are set so as to be smaller than the center value of the carrier waves.

Thus, when failures of the two inverters are not detected, the capacitor currents can be reduced, and the ripple current supplied to the motor 1 can be reduced, by reducing the ratio of the overlapping periods in which the effective voltage vectors are generated.

The carrier waves corresponding to the respective two inverters may be set so as to be different from each other by 180 degrees, and both of the average value of the voltage command values Vu1, Vv1, and Vw1 in the three phases and the average value of the voltage command values Vu2, Vv2, and Vw2 in the three phases may be set so as to be larger than the center value of the carrier waves. Even in this case, the ratio of the overlapping periods in which the effective voltage vectors are generated can be reduced. As a result, the capacitor currents can be reduced, and the ripple current supplied to the motor 1 can be reduced.

As described above, according to the power conversion device of the seventh embodiment, when failures of both of the two inverters are not detected, the phases of the carrier waves corresponding to the respective inverters are set so as to be different from each other by 180 degrees, and the average value of the voltage command values calculated for each of the inverters is set so as to be smaller than the center value of the carrier waves or larger than the center value of the carrier waves. Even with this configuration, the same effect as that of the sixth embodiment is provided.

Eighth Embodiment

In an eighth embodiment of the present invention, a description is given of an electric power steering device including the power conversion device of any one of the first to seventh embodiments. In the eighth embodiment, a description is omitted for the same points as those of the first to seventh embodiments, and is mainly given of points different from those of the first to seventh embodiments.

Figure 34:
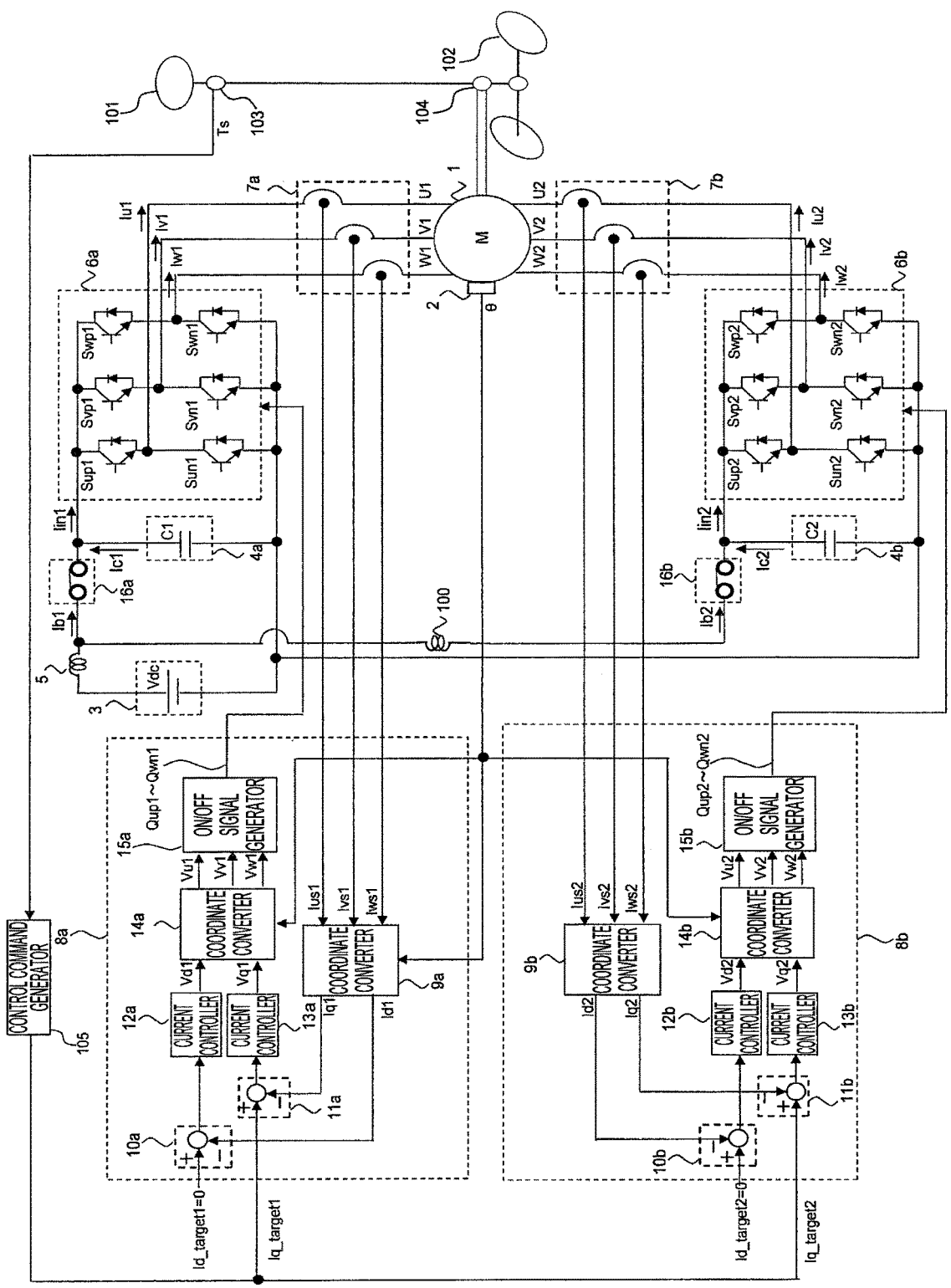
FIG. 34 is a diagram for illustrating an overall configuration of an electric power steering device according to an eighth embodiment of the present invention.

FIG. 34 is diagram for illustrating an overall configuration of the electric power steering device according to the eighth embodiment of the present invention.

A driver of a vehicle in which the electric power steering device is mounted turns a steering wheel 101 leftward and rightward, to thereby steer front wheels 102. A torque detector 103 detects a steering torque Ts of a steering system to output the detected steering torque Ts to a control command generator 105 described later. The motor 1 is configured to generate an assist torque for assisting steering by the driver through a gear 104. The motor 1 in the eighth embodiment has the same configuration as that of the motor 1 in the first embodiment except that the rotor is mechanically connected to the gear 104.

The control command generator 105 calculates a control command value for controlling the motor 1 so as to be in a desired state based on the steering torque Ts input from the torque detector 103 to output the calculated control command value. The control command generator 105 calculates the current command values Iq_target1 and Iq_target2 as a control command as given by, for example, the following Expression (8-1).

$$Iq\_target1 = Iq\_target2 = ka \times Ts/2 \qquad (8\text{-}1)$$

In Expression (8-1), ka represents a constant, but the value of ka may be set so as to change to correspond to the steering torque Ts or a travel speed of the vehicle. The current command values Iq_target1 and Iq_target2 are determined as given by Expression (8-1) in this case, but the current command values Iq_target1 and Iq_target2 may be determined based on publicly-known compensation control corresponding to the steering state.

A description is now given of effects provided by the electric power steering device according to the eighth embodiment.

Downsizing is required in the electric power steering device. The downsizing of the electric power steering device increases ease of mounting to a vehicle, increases a degree of freedom of arrangement, and also contributes to downsizing of the vehicle itself.

Downsizing of passive elements such as capacitors and coils forming the inverter provided in the electric power steering device is directly linked to downsizing of the inverter. In particular, a ratio of the size of the capacitor configured to stabilize the voltage supplied from the battery to the size of the entire inverter is very high. Thus, the capacitor is an obstacle to the downsizing of the electric power steering device. Meanwhile, due to a strong demand for reliability of the electric power steering device, it is desired that when a motor having two sets of three phase windings is driven by two inverters, and one inverter fails, the power supply to the motor be continued by the other inverter.

An increase in reliability of the power supply to the motor by the two inverters and the downsizing of the capacitors by reducing the capacitor currents can simultaneously be achieved by applying the power conversion device according to any one of the first to seventh embodiments to the electric power steering device.

In particular, the following effect can be provided by applying the control method in any one of the first to seventh embodiments to the configuration of the power conversion device including the relay configured to open the path between the inverter and the DC power supply when the inverter fails. That is, after the influence of the failed inverter on the battery or other in-vehicle devices is eliminated by opening the relay arranged close to the failed inverter, the operation of the electric power steering device can be continued by the normal inverter under the state in which the capacitor current is reduced.

As described above, the electric power steering device according to the eighth embodiment includes the power conversion device of any one of the first to seventh embodiments. As a result, there is provided such an unprecedented remarkable effect that the downsizing of the capacitor is achieved while a very high reliability is secured in the electric power steering device.

REFERENCE SIGNS LIST

1 motor, 2 position detector, 3 DC power supply, 4a, 4b capacitor, 5 inductance, 6a, 6b inverter, 7a, 7b current detector, 8*a*, 8*b* controller, 9*a*, 9*b* coordinate converter, 10*a*, 10*b* subtractor, 11*a*, 11*b* subtractor, 12*a*, 12*b* current controller, 13*a*, 13*b* current controller, 14*a*, 14*b* coordinate converter, 15*a*, 15*b* on/off signal generator, 16*a*, 16*b* relay, 17*a*, 17*b* current-vector phase calculator, 100 parasitic inductance, 101 steering wheel, 102 front wheel, 103 torque detector, 104 gear, 105 control command generator

The invention claimed is:

1. A power conversion device, comprising:
   two inverters, each of which includes a plurality of semiconductor switching elements, and is configured to invert a DC voltage output from a DC power supply into three-phase AC voltages by the respective semiconductor switching elements being switched on and off, to output the three-phase AC voltages;
   two capacitors, which individually correspond to the respective two inverters, and are provided in parallel between the DC power supply and the two inverters; and
   a controller configured to calculate voltage command values, which are command values for the three-phase AC voltages to be output from each of the two inverters, based on an input control command value, and output on/off signals for switching on and off the respective semiconductor switching elements of each of the two inverters in accordance with the voltage command values calculated for each of the two inverters,
   wherein, in response to the controller detecting a failure of one of the two inverters, the controller is configured to output the on/off signals to each of the two inverters based on two voltage vectors out of a plurality of voltage vectors defined so as to correspond to patterns of the on/off signals, the two voltage vectors are a second closest voltage vector and a third closest voltage vector in phase, amongst the plurality of voltage vectors, to a phase of a voltage command vector that is determined based on the voltage command values.

2. The power conversion device according to claim 1, further comprising two relays, which individually correspond to the respective two inverters, and are provided in series between the DC power supply and the two capacitors,
   wherein, when the controller detects a failure of any one of the two inverters, the controller opens one of the two relays corresponding to the failed one of the two inverters.

3. The power conversion device according to claim 1, wherein, when the controller does not detect failures of both of the two inverters, the controller outputs the on/off signals to each of the two inverters based on one voltage vector out of the plurality of the voltage vectors, the one voltage vector is closest in phase, amongst the plurality of voltage vectors, to the voltage command vector.

4. The power conversion device according to claim 3, wherein the controller is configured to:
   compare a carrier wave and the voltage command values with each other, to thereby output the on/off signals to each of the two inverters; and
   match, when the controller does not detect failures of both of the two inverters, phases of the carrier waves corresponding to the respective two inverters with each other, set an average value of the voltage command values calculated for one of the two inverters so as to be larger than a center value of the carrier wave, and set an average value of the voltage command values calculated for another one of the two inverters so as to be smaller than the center value of the carrier wave.

5. The power conversion device according to claim 3, wherein the controller is configured to:
   compare a carrier wave and the voltage command values with each other, to thereby output the on/off signals to each of the two inverters; and
   set, when the controller does not detect failures of both of the two inverters, phases of the carrier waves corresponding to the respective two inverters so as to be different from each other by 180 degrees, and set an average value of the voltage command values calculated for each of the two inverters so as to be smaller than a center value of the carrier wave or to be larger than the center value of the carrier wave.

6. An electric power steering device, comprising the power conversion device of claim 1.

7. A power conversion device, comprising:
   two inverters, each of which includes a plurality of semiconductor switching elements, and is configured to invert a DC voltage output from a DC power supply into three-phase AC voltages by the respective semiconductor switching elements being switched on and off, to output the three-phase AC voltages;
   two capacitors, which individually correspond to the respective two inverters, and are provided in parallel between the DC power supply and the two inverters; and
   a controller configured to calculate voltage command values, which are command values for the three-phase AC voltages to be output from each of the two inverters, based on an input control command value, and output on/off signals for switching on and off the respective semiconductor switching elements of each of the two inverters in accordance with the voltage command values calculated for each of the two inverters,
   wherein, in response to the controller detecting a failure of one of the two inverters, the controller is configured to output the on/off signals to each of the two inverters based on two voltage vectors out of a plurality of voltage vectors defined so as to correspond to patterns of the on/off signals, the two voltage vectors are a second closest voltage vector and a third closest voltage vector in phase, amongst the plurality of voltage vectors, to a phase of a voltage command vector that is determined based on the voltage command values.

8. The power conversion device according to claim 7, wherein the controller is configured to:
   compare a carrier wave and the voltage command values with each other, to thereby output the on/off signals to each of the two inverters;
   employ a lower solid two-phase modulation as a voltage modulation method when the voltage vector closest in phase to the current vector is a voltage vector formed by, out of the plurality of semiconductor switching elements, turning on two semiconductor switching elements on a high electric potential side and turning on one semiconductor switching element on a low electric potential side; and
   employ an upper solid two-phase modulation as the voltage modulation method when the voltage vector closest in phase to the current vector is a voltage vector formed by, out of the plurality of semiconductor switching elements, turning on one semiconductor switching element on the high electric potential side and turning on two semiconductor switching elements on the low electric potential side, and
   wherein the controller is configured to:

when the lower solid two-phase modulation is employed, equally shift the voltage command values so that a minimum voltage command value out of the voltage command values matches a minimum value of the carrier waves, set one phase of remaining two phases other than a minimum phase in which the voltage command value is minimum out of three phases as a carrier wave inverted phase, and invert the carrier wave in the carrier wave inverted phase about a center value as a reference with respect to the carrier wave in another phase of the remaining two phases; and when the upper solid two-phase modulation is employed, equally shift the voltage command values so that a maximum voltage command value out of the voltage command values matches a maximum value of the carrier wave, set one phase of remaining two phases other than a maximum phase in which the voltage command value is maximum out of the three phases as a carrier wave inverted phase, and invert the carrier wave in the carrier wave inverted phase about the center value as a reference with respect to the carrier wave in another phase of the remaining two phases.

9. The power conversion device according to claim 8, wherein the controller is configured to:

set the carrier wave as a sawtooth wave;

switch the carrier wave inverted phase from the one phase to the another phase at a center of a lower solid two-phase modulation section, in which the lower solid two-phase modulation is employed; and switch the carrier wave inverted phase from the one phase to the another phase at a center of an upper solid two-phase modulation section, in which the upper solid two-phase modulation is employed.

10. The power conversion device according to claim 7, wherein the controller is configured to:

compare the carrier wave and the voltage command values with each other, to thereby output the on/off signals to each of the two inverters; and set a frequency of the carrier wave in a middle phase having a second largest voltage command value out of three phases so as to be twice as high as a frequency of the carrier waves in remaining two phases other than the middle phase.

11. The power conversion device according to claim 7, further comprising two relays, which individually correspond to the respective two inverters, and are provided in series between the DC power supply and the two capacitors, wherein, when the controller detects a failure of any one of the two inverters, the controller opens one of the two relays corresponding to the failed one of the two inverters.

12. The power conversion device according to claim 7, wherein, when the controller does not detect failures of both of the two inverters, the controller outputs the on/off signals to each of the two inverters based on one voltage vector out of the plurality of the voltage vectors, the one voltage vector is closest in phase, amongst the plurality of voltage vectors, to the voltage command vector.

13. The power conversion device according to claim 12, wherein the controller is configured to:

compare a carrier wave and the voltage command values with each other, to thereby output the on/off signals to each of the two inverters; and match, when the controller does not detect failures of both of the two inverters, phases of the carrier waves corresponding to the respective two inverters with each other, set an average value of the voltage command values calculated for one of the two inverters so as to be larger than a center value of the carrier wave, and set an average value of the voltage command values calculated for another one of the two inverters so as to be smaller than the center value of the carrier wave.

14. The power conversion device according to claim 12, wherein the controller is configured to:

compare a carrier wave and the voltage command values with each other, to thereby output the on/off signals to each of the two inverters; and set, when the controller does not detect failures of both of the two inverters, phases of the carrier waves corresponding to the respective two inverters so as to be different from each other by 180 degrees, and set an average value of the voltage command values calculated for each of the two inverters so as to be smaller than a center value of the carrier wave or to be larger than the center value of the carrier waves.

15. An electric power steering device, comprising the power conversion device of claim 7.

* * * * *